(12) United States Patent
Kawase et al.

(10) Patent No.: US 7,574,288 B2
(45) Date of Patent: Aug. 11, 2009

(54) COMPUTER CIRCUIT

(75) Inventors: Yoshiyuki Kawase, Nagoya (JP); Toru Itabashi, Anjo (JP); Takanori Ishikawa, Aichi-ken (JP)

(73) Assignee: DENSO Corporation, Kariya (JP)

( * ) Notice: Subject to any disclaimer, the term of this patent is extended or adjusted under 35 U.S.C. 154(b) by 516 days.

(21) Appl. No.: 11/407,333

(22) Filed: Apr. 20, 2006

(65) Prior Publication Data
US 2006/0253718 A1 Nov. 9, 2006

(30) Foreign Application Priority Data
Apr. 20, 2005 (JP) ............................ 2005-122613
Feb. 15, 2006 (JP) ............................ 2006-038128

(51) Int. Cl.
G06F 1/32 (2006.01)
(52) U.S. Cl. .......................................... 701/1; 713/300
(58) Field of Classification Search .................. None
See application file for complete search history.

(56) References Cited

U.S. PATENT DOCUMENTS

| 5,560,023 | A | * | 9/1996 | Crump et al. ............... 713/323 |
| 5,892,893 | A | | 4/1999 | Hanf et al. |
| 6,049,885 | A | | 4/2000 | Gibson et al. |
| 6,713,994 | B2 | * | 3/2004 | Inaba .......................... 323/283 |
| 2003/0014467 | A1 | * | 1/2003 | Hanzawa ..................... 709/102 |
| 2003/0093189 | A1 | | 5/2003 | Honda |
| 2003/0155812 | A1 | | 8/2003 | Nakamura |

FOREIGN PATENT DOCUMENTS

| GB | 2 330 928 A | 5/1999 |
| JP | H10-105309 | 4/1998 |
| JP | 2003-139874 | 5/2003 |
| JP | 2003-244856 | 8/2003 |
| JP | 2005-186770 | 7/2005 |

OTHER PUBLICATIONS

Communication of Jan. 11, 2008 enclosing the Extended European Search Report dated Dec. 28, 2007 in EP 06008216.1-1245.

* cited by examiner

*Primary Examiner*—Michael J. Zanelli
(74) *Attorney, Agent, or Firm*—Nixon & Vanderhye P.C.

(57) ABSTRACT

In a computer circuit, a power supply circuit, a power supply circuit supplies a power supply voltage to a microcomputer. The power supply circuit interrupts supply of the power supply voltage to the microcomputer when receiving a suspend signal output from the microcomputer. The power supply circuit restarts the supply of the power supply voltage to the microcomputer when at least one of the first and second activate request signals is turned to a corresponding active state during interruption of the supply of the power supply voltage.

28 Claims, 12 Drawing Sheets

FIG. 13

| ACTIVATE REQUEST SIGNAL [ACTIVATION FACTOR] | FUNCTION CORRESPONDING TO ACTIVATE REQUEST SIGNAL | | | | | | | |
|---|---|---|---|---|---|---|---|---|
| | IMMOBILIZER CONTROL FUNCTION (F1) | ACCESSORY CONTROL FUNCTION (F2) | MAIN-RELAY CONTROL FUNCTION (F3) | ENGINE CONTROL FUNCTION (F4) | FUEL-TANK CONTROL FUNCTION (F5) | SHIFT-LOCK CONTROL FUNCTION (F6) | DIAGNOSIS CONTROL FUNCTION (F7) | REPROGRAM CONTROL FUNCTION (F8) |
| KEY SWITCH SIGNAL · V3 | ○ | | | | | | | |
| ACCESSORY SWITCH SIGNAL · V15 | | ○ | | | | | | |
| IGNITION SWITCH SIGNAL · V2 | ○ | ○ | ○ | ○ | ○ | ○ | ○ | ○ |
| STARTER SWITCH SIGNAL · V16 | ○ | ○ | ○ | ○ | ○ | ○ | ○ | ○ |
| WAKEUP SIGNAL · V5a | | ○ | | | | | ○ | ○ |
| FUEL FILLER LID OPENER SIGNAL · V4 | | | | | ○ | | | |
| WAKEUP SIGNAL · V5b | | | | | ○ | | | |
| SHIFT LOCK RELEASE SIGNAL · V17 | | | | | | ○ | | |

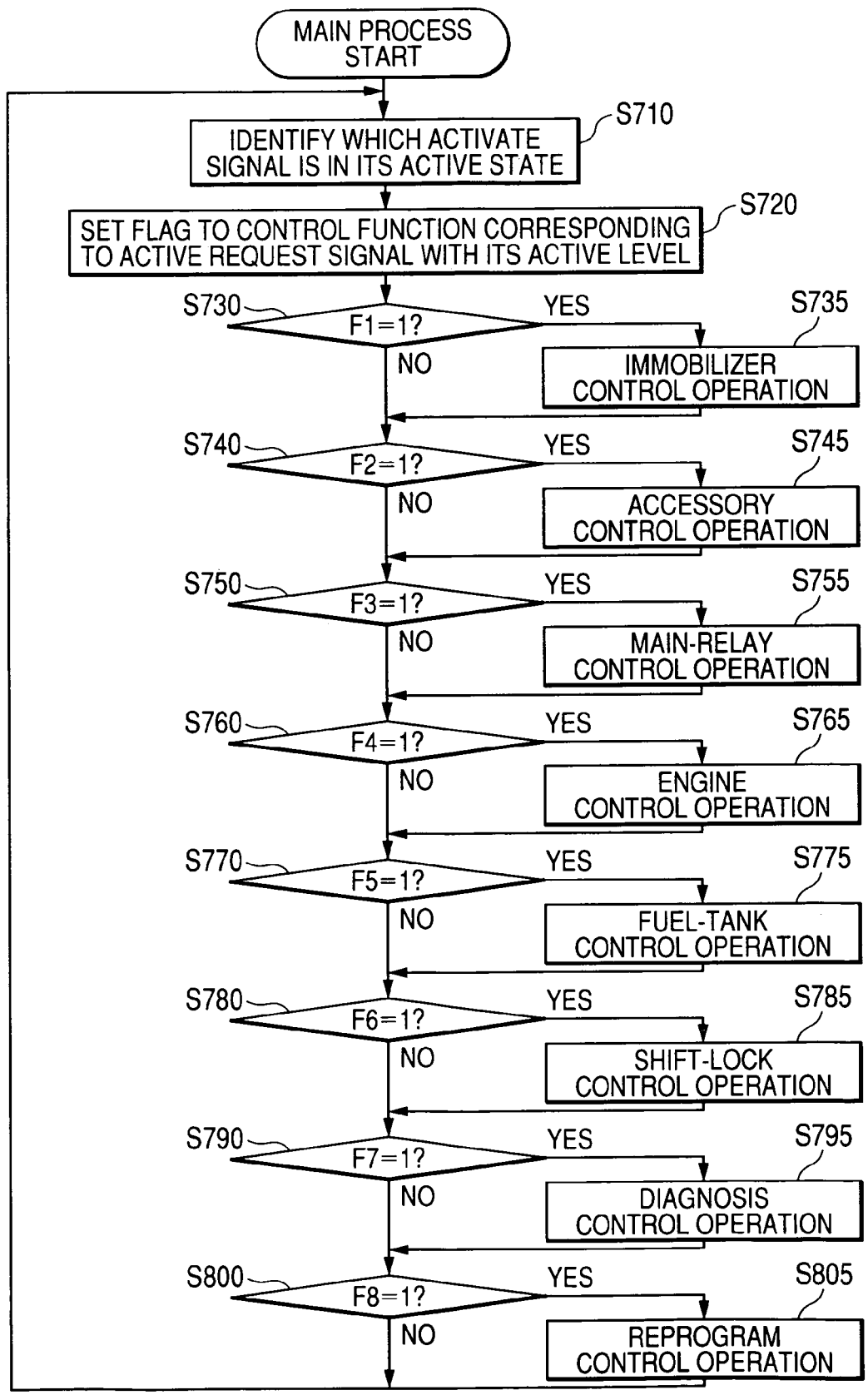

COMPUTER CIRCUIT

CROSS REFERENCE TO RELATED APPLICATIONS

This application is based on Japanese Patent Applications 2005-122613 and 2006-038128, which were filed on Apr. 20, 2005 and Feb. 15, 2006, respectively. This application claims the benefit of priority from the Japanese Patent Applications, so that the descriptions of which are all incorporated herein by reference.

FIELD OF THE INVENTION

The present invention relates to computer circuits, such as electronic control units, capable of interrupting a power supply voltage to be fed to a microcomputer from a power supply circuit when the microcomputer goes into a sleep mode.

BACKGROUND OF THE INVENTION

Conventional electronic control units as examples of computer circuits for vehicles are provided with a microcomputer operative to execute various tasks for controlling a target, and a power supply circuit. The power supply circuit is designed to step down a voltage supplied from a battery to predetermined constant voltages, and to feed the stepped down voltages to the microcomputer as operating voltages (power supply voltages).

An example of such electronic control units is disclosed in Japanese Examined Patent Publication No. 3,217,730. In the Examined Patent Publication, an electronic control unit is configured to interrupt the supply of power supply voltages to a microcomputer from a power supply circuit when the microcomputer goes into a sleep mode, thereby reducing consumption current therein.

Specifically, the electronic control unit disclosed in the Examined Patent Publication is provided with a pair of CAN buses, and a semiconductor circuit disposed between the paired CAN buses and a bus protocol module installed in the microcomputer; this semiconductor circuit is operative to control communications between the microcomputer and other devices through the paired CAN buses.

When the electronic control unit shifts into a sleep mode by the state signal of the microcomputer, the semiconductor circuit outputs an interruption signal to a voltage regulator as the power supply circuit; this interruption signal directs the voltage regulator to interrupt the supply of the operating voltages to the microcomputer. This results in that no operating voltages are supplied to the microcomputer from the voltage regulator.

In addition, when receiving an exteriorly sent wakeup signal through the paired CAN buses or other signal lines, the semiconductor circuit outputs, to the voltage regulator, an activate signal directing the voltage regulator to activate the microcomputer. Thus, the voltage regulator supplies the operating voltages to the microcomputer, thereby activating the microcomputer.

Note that the interruption signal and the activate signal are configured to be output from the semiconductor circuit to the voltage regulator through a single signal line. For example, when a signal with a low level is sent from the semiconductor circuit to the voltage regulator through the single signal line, the signal serves as the interruption signal. In addition, when a signal with a high level is sent from the semiconductor circuit to the voltage regulator through the single signal line, the signal serves as the activate signal.

In the disclosed Patent Publication, the state signal of the microcomputer output therefrom specifically means a signal output from the microcomputer to request the semiconductor circuit to interrupt the supply of the operating voltages to the microcomputer when the microcomputer determines that it is allowed to put itself to "sleep". Specifically, the electronic control unit disclosed in the Examined Patent Publication is configured such that the semiconductor circuit recognizes the state signal output from the microcomputer and controls the power supply circuit to interrupt the supply of the operating voltages to the microcomputer in response to the recognition.

The configuration of the electronic control unit disclosed in the Examined Patent Publication may however interrupt the supply of the operating voltages to the microcomputer to put the electronic control unit out of operation in the case of only a semiconductor-circuit failure.

A semiconductor-circuit failure also may cause a cessation of the microcomputer activation, in other words, the electronic control unit activation.

Moreover, in the Examined Patent Publication, power-supply control functions for "sleep" and "wakeup" of the microcomputer have been collectively installed as circuit elements in the semiconductor circuit for communication control between the microcomputer and other devices through the paired CAN buses. This may cause waste of circuit resources when the electronic control unit needs to be provided with the number of paired CAN buses for the following reason:

Specifically, establishment of the number of paired CAN buses requires the corresponding number of the semiconductor circuits provided in the electronic control unit. Because any one of the semiconductor circuits probably handles the power-supply control functions, the circuit elements offering the power-supply control functions installed in the remaining semiconductor circuits may be wasted, causing the cost of the electronic control unit to increase. The number of the semiconductor circuits provided in the electronic control unit may require a specific configuration for preventing between the respective power-supply controls of the plurality of semiconductor circuits.

SUMMARY OF THE INVENTION

In view of the background, an object of at least one aspect of the present invention is to improve reliability of a computer circuit with a function of interrupting the supply of a power supply voltage to a computer in a sleep mode.

According to one aspect of the present invention, there is provided a computer circuit. The computer circuit includes a computer operating based on a power supply voltage to output a suspend signal when it is determined that a predetermined suspend condition is satisfied. The computer circuit also includes an activate circuit communicably coupled to the computer and configured to output a first activate request signal when it is determined that a predetermined activation condition is satisfied. The computer circuit further includes a power supply circuit communicably coupled to the computer and the activate circuit so that the first activate request signal and a second activate request signal are input thereto. The second activate signal is sent from an exterior of the computer circuit. The suspend signal output from the computer is directly input to the power supply circuit. The power supply circuit is configured to supply the power supply voltage to the computer, interrupt supply of the power supply voltage to the computer when receiving the suspend signal, and restart the supply of the power supply voltage to the computer when at least one of the first and second activate request signals is turned to a corresponding active state during interruption of the supply of the power supply voltage.

BRIEF DESCRIPTION OF THE DRAWINGS

Other objects and aspects of the invention will become apparent from the following description of embodiments with reference to the accompanying drawings in which:

FIG. 13 is a table schematically illustrating a relationship between control functions to be executed by the microcomputer and activate request signals according to the second embodiment;

FIG. 15 is a flowchart schematically illustrating a main process to be executed by the microcomputer according to a third embodiment of the present invention.

DETAILED DESCRIPTION OF EMBODIMENTS OF THE INVENTION

Embodiments of the present invention will be described hereinafter with reference to the accompanying drawings.

First Embodiment

Figure 1:
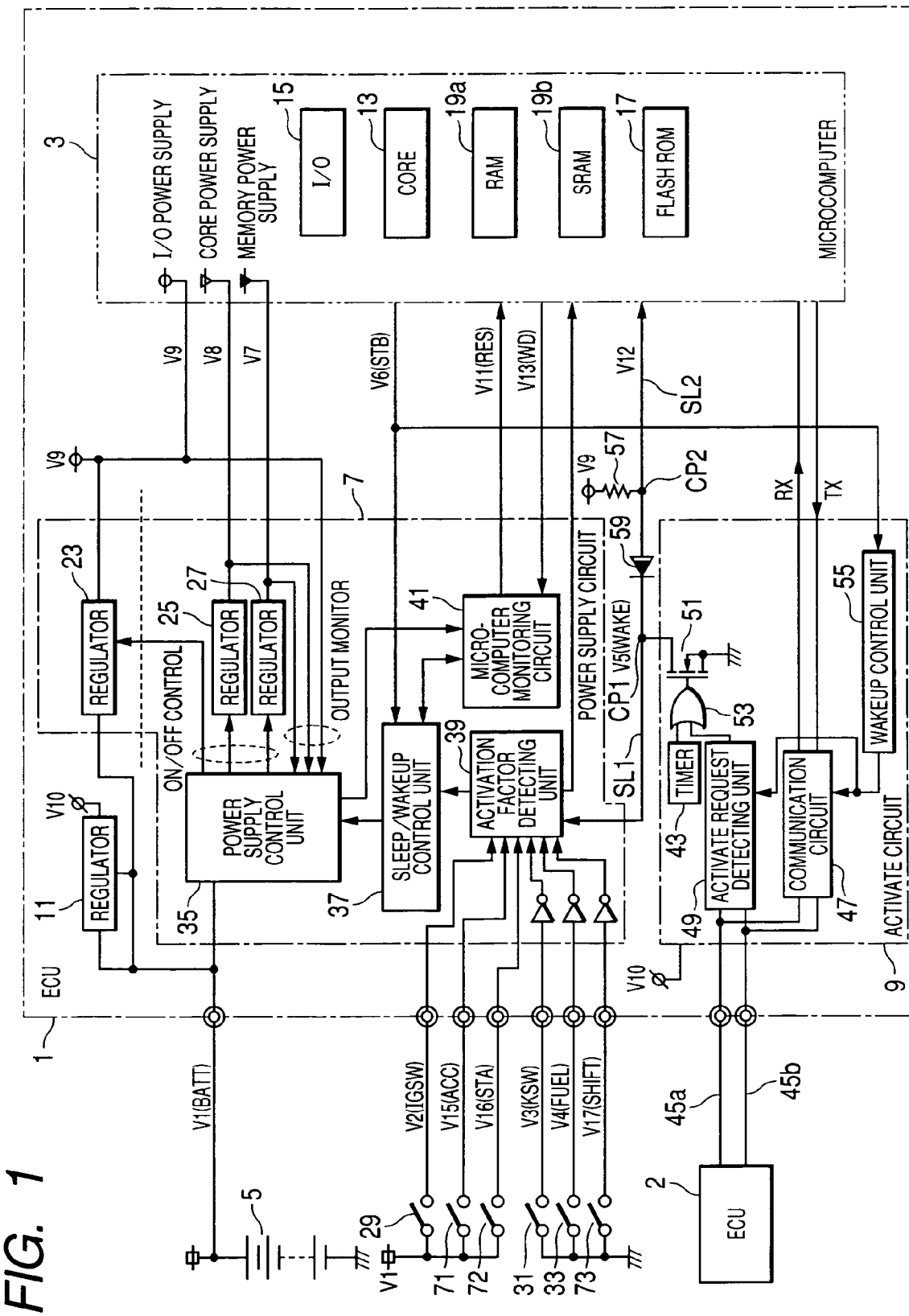
FIG. 1 is a circuit diagram schematically illustrating the configuration of an electronic control unit according to a first embodiment of the present invention.

Referring to the drawings, in which like reference characters refer to like parts in several views, particularly to FIG. 1, there is illustrated an electronic control unit, as an example of computer circuits, 1 according to a first embodiment of the present invention. The electronic control unit, referred to simply as "ECU" hereinafter, 1 has been installed in, for example, a vehicle. The ECU 1 is operative to share data with other ECUs, such as an ECU 2 shown in FIG. 1, by communications therebetween, and to control various devices, such as engine's actuators and transmissions, installed in the vehicle.

Specifically, the ECU 1 includes a microcomputer 3 and a power supply circuit 7 electrically connected thereto and to a battery 5 installed in the vehicle as an exterior power source.

The microcomputer 3 is operative to execute various tasks for controlling the various devices as the target.

The power supply circuit 7 is configured to:

step down a battery voltage V1 fed from the battery 5 to predetermined constant power supply voltages required to allow the microcomputer 3 to operate, thereby outputting the stepped down power supply voltages to the microcomputer 3, interrupt the output of the power supply voltages to the microcomputer 3 when a standby signal (suspend signal) V6, which is being directly input from the microcomputer 3, is turned to a low level as its active level, and start the output of the power supply voltages to the microcomputer 3 when receiving at least one of activate request signals during interruption of the output of the power supply voltages to the microcomputer 3.

The ECU 1 also includes an activate circuit 9 electrically connected to the microcomputer 3 and the power supply circuit 7, and a regulator 11 electrically connected to the battery 5 and the power supply circuit 7.

The activate circuit 9 is configured to turn the output level of a wakeup signal V5 to its low level as its active level when a specific activate condition is established during interruption of the output of the power supply voltages to the microcomputer 3. The wakeup signal V5 is one of the activate request signals, and corresponds to, for example, an activate request signal created within the ECU 1.

The regulator 11 is configured to step down the battery voltage V1 supplied from the battery 5 to a predetermined constant power supply voltage V10 (e.g. 5 V) required to allow the activate circuit 9 to operate, thereby constantly outputting the stepped down constant voltage V10 to the activate circuit 9.

The microcomputer 3 is integrated with a microcomputer core, referred to simply as "core", 13, a input/output interface, referred to simply as "I/O", 15, a flash ROM (Read Only Memory) 17, a RAM (Random Access Memory) 19a, and a SRAM (Standby RAM) 19b. The elements 13, 15, 17, 19a, and 19b are communicably coupled to each other through, for example, buses.

The core 13 is composed of a CPU and registers and operative to execute programs installed in the microcomputer 3. The I/O 15 is operative to input/output signals to/from the microcomputer 3. The flash ROM 17 is a nonvolatile memory. The flash memory 17 is operative to have stored therein the programs to be executed by the core 13, and allows the core 13 to rewrite data stored therein.

The RAM 19a is a volatile memory and operative to store data representing processing results of the core 13, and other pieces of data. The data representing the processing results of the core 13 will be referred as "processing result data". The SRAM 19b is provided in the microcomputer 3 independently of the RAM 19a so as to store specific pieces of data included in the processing result data; these pieces of data should be continuously stored in the microcomputer 3 during the interruption of the supply of the power supply voltages to the microcomputer 3.

The power supply voltages to be supplied to the microcomputer 3 from the power supply circuit 7 include a power supply voltage V7 for the memories, a power supply voltage V8 for the core 13, and a power supply voltage V9 for the I/O 15. Inside the microcomputer 3, the power supply voltage V7 is fed to the SRAM 19b, the power supply voltage V8 is fed to the core 13, the RAM 19a, and the flash ROM 17, and the power supply voltage V9 is fed to the I/O 15.

Note that the power supply voltage V9 for the I/O 15 is set to a predetermined value of, for example, 5 V, and that the other power supply voltages V7 and V8 are set to predetermined values that are different and lower from the predetermined value of the power supply voltage V9. The values of the power supply voltages V7 and V8 can be set to be identical to each other. The power supply voltage V8 can be supplied only to the core 13, and the power supply voltage V7 for the memories can be supplied to the RAM 19a and the flash ROM 17 in addition to the SRAM 19b.

In the first embodiment, the activate circuit 9 is preferably designed as a single semiconductor IC package, in other words, is preferably designed as an IC.

The power supply circuit 7 is composed of a regulator 23 for generating the power supply voltage V9 being sufficiently regulated, a regulator 25 for generating the power supply voltage V8 being sufficiently regulated, and a regulator 27 for generating the power supply voltage V7 being sufficiently regulated. The components of the power supply circuit 7 except for the regulator 23 for the power supply voltage V9 are preferably integrated into a single device. In other words, the regulator 23 is preferably designed as a component independently of the other integrated components of the power supply circuit 7.

The reason for the configuration of the power supply circuit 7 is mainly to support various types of other systems. Specifically, because the power supply voltage V9 is commonly used in input/output circuit modules between the microcomputer 3 and the other systems disposed exterior thereof, the level of the power supply voltage V9 to be required for the other systems depends thereon. For this reason, the regulator 23 for outputting the power supply voltage V9 for the I/O 15 is provided independently of the other integrated components of the power supply circuit 7, which allows the output voltage level of the regulator 23 to be easily controlled. This can increase the usability of the ECU 1.

To the power supply circuit 7 (for details, the integrated components thereof), in addition to the wakeup signal (internally generated activate request signal) V5 sent from the activate circuit 9, some of the activate request signals, which are sent from the exterior of the ECU 1, are input.

For example, the external activate signals include:

an ignition switch signal V2 with, for example, positive logic (high active) representing the timing when an ignition switch 29 of the vehicle is turned on by, for example, the location of an ignition key of the vehicle being inserted in a key cylinder thereof to the ignition position from the off position by the vehicle's driver;

a key switch signal V3 with, for example, negative logic (low active) representing the timing when a key switch 31 is turned on in response to insertion of the ignition key into the key cylinder by the driver;

a fuel filler lid opener signal V4 with, for example, low active representing the timing when a fuel filler lid opener switch 33 for opening a fuel filler opening of a fuel tank of the vehicle is turned on by the driver;

an accessory switch signal V15 with, for example, high active representing the timing when an accessory switch 71 of the vehicle for allowing an occupant of the vehicle to operate accessories installed in the vehicle without engaging the engine is turned on by, for example, locating the ignition key being inserted in the key cylinder to the accessory position by the driver;

a starter switch signal V16 with, for example, high active representing the timing when a starter switch, such as a solenoid starter switch, 72 of the vehicle for cranking the engine is turned on by, for example, locating the ignition key being inserted in the key cylinder to the starter position by the driver; and a shift (selector lever) lock release switch signal V17 with, for example, low active representing the timing when a shift lock release switch 73 for releasing the shift lock (gear shift lever lock) is turned on by the driver.

Note that a signal with high active means a signal whose active level is a high level, such as the battery voltage level (V1), and a signal with low active means a signal whose active level is a low level, such as the ground level (0 V).

Next, the configuration of the power supply circuit 7 will be described in detail hereinafter.

As illustrated in FIG. 1, the power supply circuit 7 is composed of, in addition to the regulators 23, 25, and 27, a power-supply control unit 35, a sleep/wakeup control unit 37, an activation-factor detecting unit 39, and a microcomputer monitoring circuit 41.

The power-supply control unit 35 is connected to the regulators 23, 25, and 27 and operative to control all of them. The power-supply control unit 35 is also connected to the sleep/wakeup control unit 37. The sleep/wakeup control unit 37 is communicably linked to the activation-factor detecting unit 39 and the microcomputer monitoring circuit 41, and further to the microcomputer 3 such that the standby signal V6 is allowed to be directly input from the microcomputer 3 thereto. The activation-factor detecting unit 39 and the microcomputer monitoring circuit 41 are also communicably linked to the microcomputer 3.

When receiving an output enabling signal sent from the sleep/wakeup control unit 37, the power-supply control unit 35 controls the regulators 23, 25, and 27 to set the power supply voltages V7, V8, and V9 to the corresponding predetermined values, respectively.

When receiving an output disable signal sent from the sleep/wakeup control unit 37, the power-supply control unit 35 controls the regulators 23, 25, and 27 to interrupt the outputs of the power supply voltages V7, V8, and V9, respectively.

Figure 5:
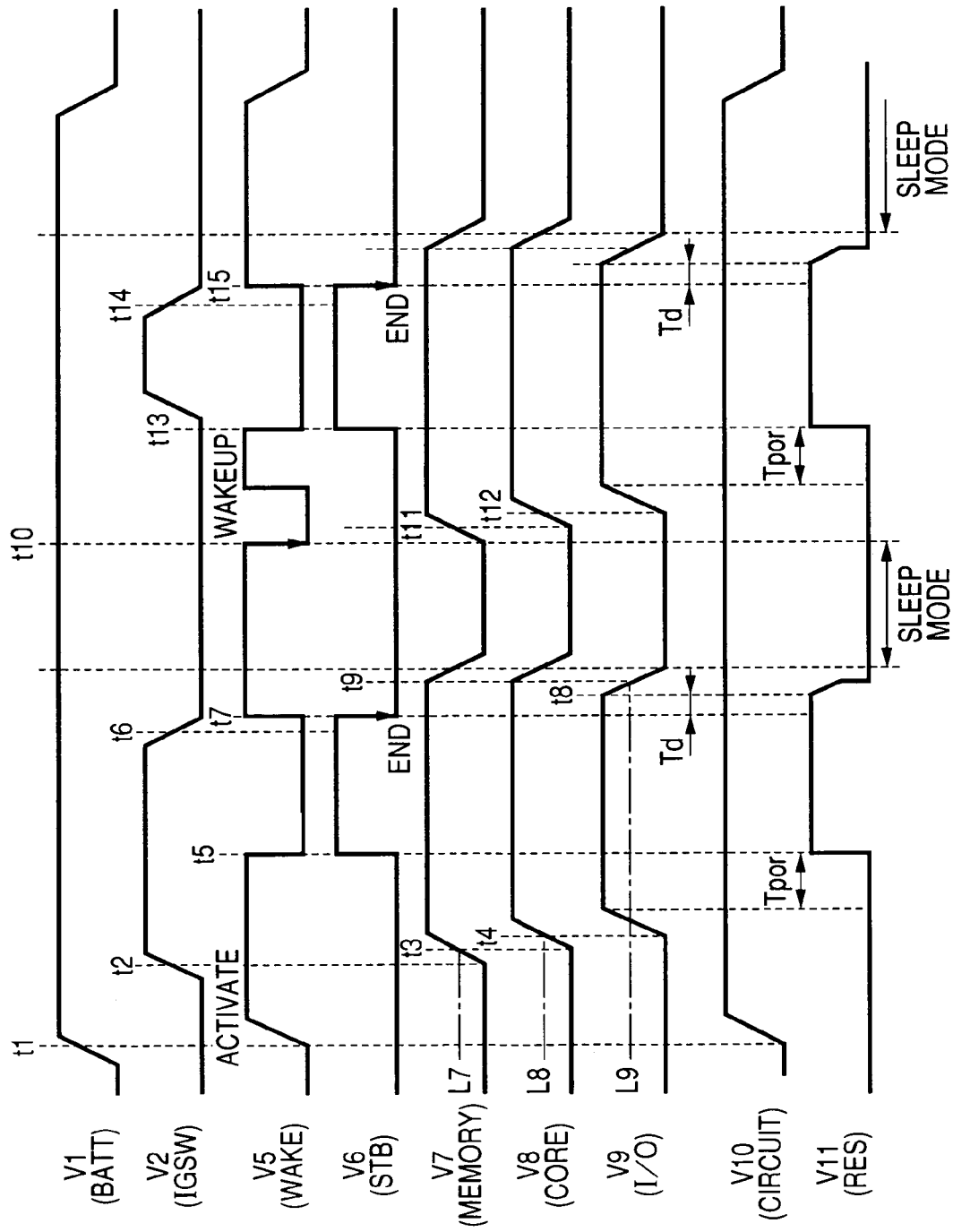
FIG. 5 is a timing chart schematically illustrating timings of rising and falling of voltages to be supplied inside the electronic control unit.

Especially, when starting to output the power supply voltages V7 to V9, as illustrated by the timing chart of FIG. 5, the power-supply control unit 35 controls the regulator 27 to start to output the power supply voltage V7 at the timing t2 in FIG. 5. When the power supply voltage V7 rises to a corresponding threshold level L7, the power-supply control unit 35 controls the regulator 25 to start to output the power supply voltage V8 at the timing t3 in FIG. 5.

When the power supply voltage V8 rises to a corresponding threshold level L8, the power-supply control unit 35 controls the regulator 23 to start to output the power supply voltage V9 at the timing t4 in FIG. 5.

In addition, when interrupting the output of the power supply voltages V7 to V9, as illustrated in FIG. 5, the power-supply control unit 35 controls the regulator 23 to stop the output of the power supply voltage V9 at the timing t8 in FIG.

5. When the power supply voltage V9 falls down to reach a threshold level L9 between the predetermined value and, for example, the zero level (ground level), the power-supply control unit 35 controls the regulators 25 and 27 to interrupt the respective outputs of the power supply voltages V8 and V7 at the timing t9 in FIG. 5.

Note that the power-supply control unit 35 is designed to carry out the start/interrupt sequence control set forth above for the following reason:

Specifically, during the microcomputer start-up, if the power supply voltage V9 for the I/O 15 reached the threshold level L9 before the power supply voltage V8 reached the threshold level L8, indefinite signals would be output from the I/O 15. Similarly, while the microcomputer 3 shifts into a sleep mode (suspend mode), if the power supply voltage V8 for the core 13 was interrupted before the power supply voltage V9 was interrupted, indefinite signals would be output from the I/O 15.

Therefore, while the power supply voltage V9 is supplied to the I/O 15, the power-supply control unit 35 must control the regulators 25 and 27 to output the power supply voltages V8 and V7 to the core 13 and all of the memories 17, 19a, and 19b. This makes it possible to prevent indefinite signals from being output from the I/O 15.

During the outputs of the power supply voltages V7, V8, and V9 being interrupted from the regulators 27, 25, and 23, the sleep/wakeup control unit 37 is operative to output the output enabling signal to the power-supply control unit 35 when receiving notification sent from the activation-factor detecting unit 39. This causes the regulators 27, 25, and 23 to start to supply the power supply voltages V7, V8, and V9 to the microcomputer 3. The notification represents that at least one of the activate request signals including exteriorly sent activate request signals and the internally created activate request signal V5 from the activate circuit 9 is turned to the corresponding active level.

Figure 2:
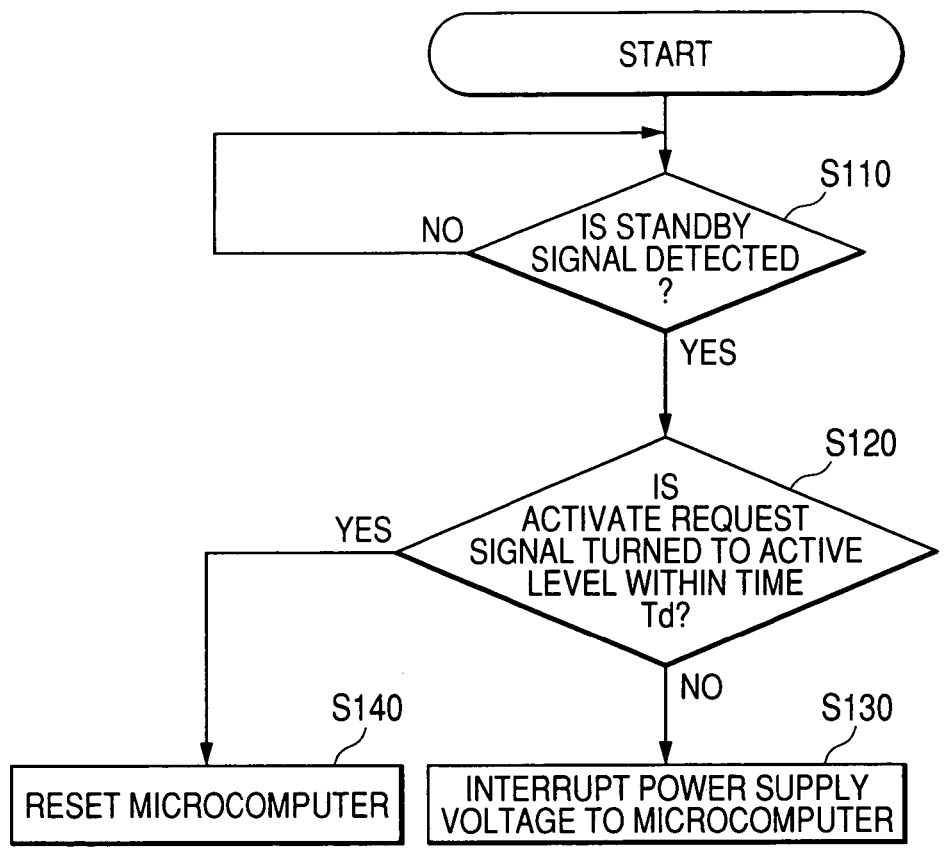
FIG. 2 is a flowchart schematically illustrating operations of a sleep/wakeup control unit illustrated in FIG. 1.

During the power supply voltages V7, V8, and V9 being interrupted from the regulators 27, 25, and 23, the sleep/wakeup control unit 37 executes the following operations (steps) illustrated in the flowchart of FIG. 2. For example, the sleep/wakeup control unit 37 is designed to a computer circuit and programmed to execute the following operations in the flowchart.

Specifically, when detecting that the standby signal V6 is turned to its low level from its high level (the determination in step S110 of FIG. 2 is YES), the sleep/wakeup control unit 37 goes to step S120. In step S120, the sleep/wakeup control unit 37 determines whether at least one of the activate request signals is turned to the corresponding active level within a predetermined period Td from the low-level standby signal detecting timing in step S120.

For example, in step S120, the sleep/wakeup control unit 37 determines that at least one of the activate request signals is turned to the corresponding active level within the predetermined period Td from the low-level standby signal detecting timing in step S120 when receiving the notification sent from the activation-factor detecting unit 39.

If it is determined that no activate request signals are turned to the corresponding active levels within the predetermined period Td from the low-level standby signal detecting timing (the determination in step S120 is NO), the sleep/wakeup control unit 37 goes to step S130. In step S130, the sleep/wakeup control unit 37 outputs the output disable signal to the power-supply control unit 35, thereby causing it to interrupt the output of the power supply voltages V7 to V9 to the microcomputer 3.

Otherwise if it is determined that at lest one of the activate request signals is turned to the corresponding active level within the predetermined period Td from the low-level standby signal detecting timing (the determination in step S120 is YES), the sleep/wakeup control unit 37 goes to step S140. In step S140, the sleep/wakeup control unit 37 resets the microcomputer 3 to its initial state without interrupting the output of the power supply voltages V7 to V9, thereby restarting the microcomputer 3 therefrom.

For example, in step S140, the reset operation by the sleep/wakeup control unit 37 includes:

instructing the microcomputer monitoring unit 41 to turn a reset signal V11, which is continuously sent from the microcomputer monitoring unit 41 to the microcomputer 3 with a high level, to a low level, which, for example, serves as an active level; and holding the low level (active level) of the reset signal within a predetermined period so that the reset signal with the low level resets the microcomputer 3.

As set forth above, to the activation-factor detecting unit 39, the exteriorly sent activate request signals and the internally created activate request signal (wakeup signal V5) are input. Specifically, the activation-factor detecting unit 39 in the power supply circuit 7 serves as means to accept the plurality of activate request signals.

When detecting that at least one of the activate request signals is turned to the corresponding active level, the activation-factor detecting unit 39 works to;

send, to the sleep/wakeup control unit 37, the notification representing that at least one of the activate request signals is turned to the corresponding active level; and store therein record information representing that at least one of the activate request signals is turned to the corresponding active level and allowing identification of which activation request signal is turned to the corresponding active level.

The record information will be referred to as "occurrence record of the activate request signals" or simply as "occurrence record" hereinafter.

The occurrence record stored in the activation-factor detecting unit 39 is so configured as to permit the microcomputer's access and readout thereto. Specifically, the microcomputer 3 can recognize that which activate request signal causes it to activate according to the occurrence record stored in the activation-factor detecting unit 39.

The microcomputer monitoring unit 41 is operative to:

monitor whether a well-known watchdog pulse signal V13 consisting of a train of watchdog pulses is normally output from the microcomputer 3;

determine that the microcomputer operating state is in abnormal when a watch dog pulse of the watchdog pulse signal V13 is not output from the microcomputer 3 within maximum permitted period; and turn, to the active level (low level), the reset signal V11, which is continuously sent to the microcomputer 3 from the microcomputer monitoring unit 41, to hold it within the predetermined period.

This allows the microcomputer 3 to try to return to its normal operating state.

In addition, the microcomputer monitoring unit 41 is operative to notify the sleep/wakeup control unit 37 in real time of what the monitoring function thereof tries to reset the microcomputer 3, in other words, what the monitoring function holds the low level (active level) of the reset signal V11. This permits the sleep/wakeup control unit 37 to recognize that the current state of the reset signal V11 being continuously sent to the microcomputer 3 from the microcomputer monitoring unit 41.

Moreover, when all of the power supply voltages V7 to V9 reach respectively the corresponding proper threshold levels L7 to L9 at the start of supplying the power supply voltages V7 to V9, the power-supply control unit 35 gives the microcomputer monitoring unit 41 voltage normal notice, so that the microcomputer monitoring unit 41 receives it.

Furthermore, as illustrated by the timings t4 and t5 in FIG. 5, at the start of supplying the power supply voltages V7 to V9, the microcomputer monitoring unit 41 performs a power-on reset (POR) process so that the microcomputer 3 shifts into a power-on reset mode.

Specifically, as the POR process, the microcomputer monitoring unit 41 holds the low level of the reset signal continuously sent to the microcomputer 3 until a predetermined constant period Tpor has elapsed from receiving the voltage normal notice given from the power-supply control unit 35.

The activate circuit 9 is composed of a timer 43 for detecting that a predetermined timer period has elapsed since output of the standby signal V6 from the microcomputer 3, in other words, since the change of the standby signal V6 from its high level to its low level (active level). The activate circuit 9 is also composed of a communication circuit 47 configured to allow communications between the microcomputer 3 and other devices including the ECU 2 in the first embodiment; these other devices and the microcomputer 3 are respectively linked to communication lines 45a 45b provided in the vehicle.

The activate circuit 9 is composed of an activate request detecting unit 49 coupled to the communication lines 45a and 45b. The activate request detecting unit 49 is operative to detect that a pulse edge, such as a rising edge or a falling edge, appears as a specific signal through at least one of the communication lines 45a and 45b; this pulse edge is created by at least one of the other devices, such as the ECU 2 in the first embodiment.

In addition, the active circuit 9 is composed of an N-channel MOSFET 51 whose drain is connected to a signal line SL1 through which the wakeup signal V5 is sent to the power supply circuit 7 from the active circuit 9; source of this N-channel MOSFET 51 is connected to a ground line with 0 V.

The active circuit 9 is composed of a drive circuit 53 coupled respectively to gate of the N-channel MOSFET 51, to the activate request detecting unit 49, and to the timer 43. The drive circuit 53 is operative to turn the N-channel MOSFET 51 on and to hold the on-state within a predetermined period when the timer 43 detects that the predetermined timer period has elapsed or when the activate request detecting unit 49 detects that a pulse edge appears through at least one of the communication lines 45a and 45b.

The active circuit 9 is composed of a wakeup control unit 55. The wakeup control unit 55 is communicably coupled to the communication circuit 47 and the activate request detecting unit 49, and further to the microcomputer 3 such that the standby signal V6 is allowed to be directly input from the microcomputer 3 thereto. The wakeup control unit 55 is operative to prevent the communication circuit 47 from working and to allow the activate request detecting unit 49 to operate when the standby signal V6 being input from the microcomputer 3 is turned from its high level to its low level. The wakeup control unit 55 is also operative to prevent the activate request detecting unit 49 from working and to allow the communication circuit 47 to operate when the standby signal V6 being input from the microcomputer 3 is turned from its low level to its high level.

The ECU 1 is provided with a resistor 57 connected to a power supply line connected to the regulator 23 and to the signal line SL1. The resistor 57 is configured to pull up the potential at the signal line SL1 to the power supply voltage V9 for the I/O 15.

The signal line SL1 is configured to be pulled up to an internal power, supply voltage of the power supply circuit 7 by a resistor (not shown); this internal power supply voltage is generated based on the battery voltage V1.

In addition, the ECU 1 is provided with a diode 59 provided on the path of the signal line SL1 between its first connect point CP1 connected to the drain of the activate circuit 9 and its second connect point CP2 connected to the resistor 57 such that the anode is directed to the side of the resistor 57.

In the configuration of the activate circuit 9, when the timer 43 detects that the predetermined timer period has elapsed since output of the standby signal V6 from the microcomputer 3, or when the activate request detecting unit 49 detects that a pulse edge appears through at least one of the communication lines 45a and 45b, it is determined that activation condition to activate the microcomputer 3 is satisfied. Thus, the drive circuit 53 turns the N-channel MOSFET 51 on and holds the on-state within the predetermined period. The on state of the MOSFET 51 allows the signal line SL1 to be connected to the ground line so that the wakeup signal V5 is turned from its high level to its low level (active level). Specifically, the wakeup signal V5 with the active level (low level) as one of the activate request signals is configured to be output in a one-shot (monostable) mode from the activate circuit 9 to the power supply circuit 7.

In addition, in the configuration of the active circuit 9, when the standby signal V6 being input from the microcomputer 3 is turned from its low level to its high level, the operation of the communication circuit 47 is prevented, which can reduce power consumption of the activate circuit 9. In other words, the activate circuit 9 is configured to shift its operating mode to a power-consumption reducing mode when the standby signal V6 with its active level (low level) is output from the microcomputer 3.

Note that a signal line SL2 is disposed to connect between the microcomputer 3 and the second connect point CP2, which allows the microcomputer 3 to monitor the state of the wakeup signal V5 as the voltage V12 at the second connect point CP2. The diode 59 is so disposed on the signal line SL1 as to prevent current from flowing toward the microcomputer 3 therethrough from the power supply circuit side. The communication circuit 47 in the activate circuit 9 and the microcomputer 3 are communicably connected to each other through communication lines RX and TX provided in the ECU 1.

Next, operations of the microcomputer 3 will be described hereinafter with reference to FIGS. 3 and 4.

Figure 3:
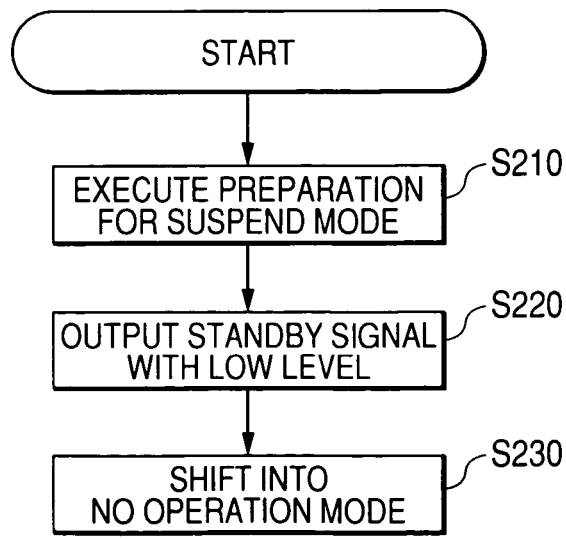
FIG. 3 is a flowchart schematically illustrating operations to be executed by a microcomputer illustrated in FIG. 1 when the microcomputer determines that suspend condition in the microcomputer is satisfied.

FIG. 3 is a flowchart schematically illustrating operations to be executed by the microcomputer 3 when the microcomputer 3 determines that suspend condition in the microcomputer 3 is satisfied. For example, the microcomputer 3 is configured to execute the operations illustrated in FIG. 3 in accordance with at least one program stored in one of the memories 15, 17, 19a, and 19b.

Note that the suspend condition represents condition for the microcomputer 3 to shift its operation mode into the suspend mode. Specifically, when determining that all of the externally and internally input activate request signals including the wakeup signal V5 respectively have inactive levels, and that the microcomputer 3 is in a state unnecessary to control the target, the microcomputer 3 recognizes that the suspend condition in the microcomputer 3 is satisfied, thereby executing the following operations illustrated in FIG. 3.

When starting the operations illustrated in FIG. 3, the microcomputer 3 executes preparations required to shift its operation mode into the suspend mode in step S210. The preparations include at least a process of saving specific data stored in the SRAM 19b to a predetermined area of the flash ROM 17, and that of clearing the occurrence record stored in the activation-factor detecting unit 39 of the power supply circuit 7.

After the preparations have been completed, the microcomputer 3 outputs the standby signal V6 with its low level (active level), in other words, turns its high level of the standby signal V6 to its low level in step S220, and shifts into the suspend mode (no operation mode) in step S230.

If it is determined that no activate request signals are turned to the corresponding active levels within the predetermined period Td from the low-level standby signal detecting timing, the output of the power supply voltages V7 to V9 from the power supply circuit 7 to the microcomputer 3 is interrupted by the operation of the sleep/wakeup control unit 37 (see "NO" in step S120 and step S130 of FIG. 2).

Figure 4:
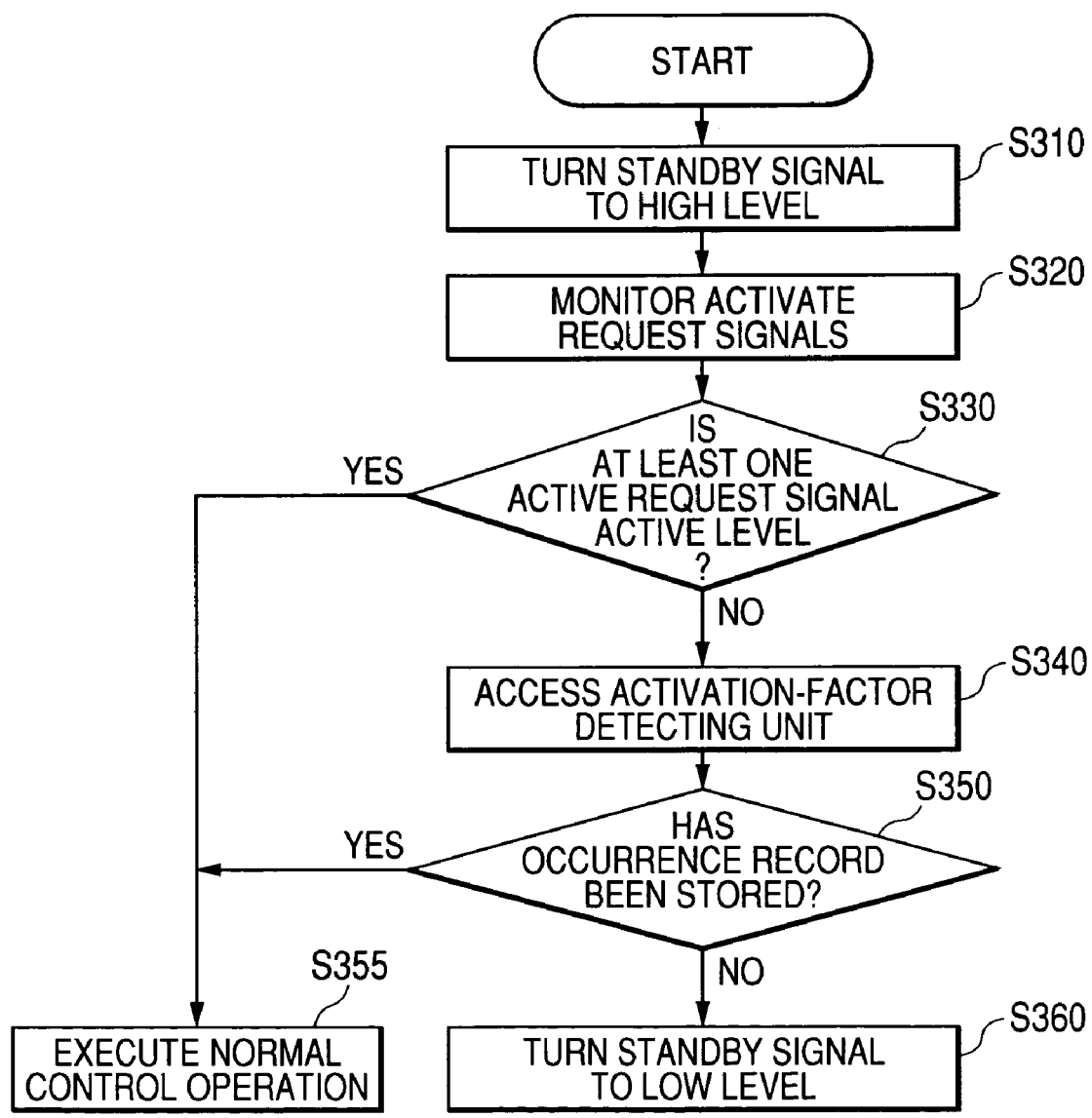
FIG. 4 is a flowchart schematically illustrating operations to be executed by the microcomputer when the microcomputer is activated.

In addition, FIG. 4 is a flowchart schematically illustrating operations to be executed by the microcomputer 3 when the microcomputer 3 is activated. For example, the microcomputer 3 is configured to execute the operations illustrated in FIG. 4 in accordance with at least one program stored in, for example, the flash ROM 17.

When being up, the microcomputer 3 turns the standby signal V6 from its low level to its high level in step S310. Next, the microcomputer 3 monitors the current states of the exteriorly sent activate request signals and the current state of the internally created activate request signal (wakeup signal) V5 in step S320, and determines whether at least one of the externally and internally input activate request signals is in its active level in step S330.

If it is determined that at least one of the externally and internally input activate request signals is in its active level (the determination in step S330 is YES), the microcomputer 3 proceeds to normal control operations to control the target (not shown) corresponding to at least one of the externally and internally input activate request signals with its active level. Before starting the control operations, the microcomputer 3 loads the saved data in the predetermined area of the flash ROM 17 into the SRAM 19b, thereby updating the SRAM 19b by the saved data.

For example, in the step S330, when at least one of the externally and internally input activate request signals having its active level is the ignition switch signal V2, the microcomputer 3 allows control of at least one target device that should operate during the on state of the ignition switch 29 in response to the turn-on of the ignition switch 29.

For another example, in the step S330, when at least one of the externally and internally input activate request signals having its active level is the accessory switch signal V15, the microcomputer 3 allows control of at least one target device that should operate during the on state of the accessory switch 71 in response to the turn-on of the accessory switch 71.

For a further example, in the step S330, when at least one of the externally and internally input activate request signals having its active level is the starter switch signal V16, the microcomputer 3 allows control of at least one target device that should operate during the on state of the starter switch 72 in response to the turn-on of the starter switch 72.

For a still further example, in the step S330, when at least one of the externally and internally input activate request signals having its active level is the key switch signal V3, the microcomputer 3 can boot up before engine starting to perform antitheft control of the vehicle in response to the turn-on of the key switch 31. For example, as the antitheft control, the microcomputer 3 communicates with an immobilizer (not shown) to check an identifier of the inserted ignition key against an identifier that has been registered in the immobilizer.

For a still further example, in the step S330, when at least one of the externally and internally input activate request signals having its active level is the fuel filler lid opener signal V4, the microcomputer 3 allows control of the internal pressure in the fuel tank before opening the fuel filler opening thereof in response to the turn-on of the fuel filler iid opener switch 33. This can prevent opening of the fuel filler opening in a high internal pressure in the fuel tank, thereby avoiding the spout of fuel from the tank.

For a still further example, in the step S330, when at least one of the externally and internally input activate request signals having its active level is the shift lock release switch signal V17, the microcomputer 3 allows shift change control during engine shutdown in response to the turn-on of the shift lock release switch 73. Specifically, as the shift change control, the microcomputer 3 shifts the transmission to the neutral position in response to the turn-on of the shift lock release switch 73. This allows diver's turn-on of the shift lock release switch 73 to shift the transmission to the neutral position when the vehicle breaks down while the transmission is located at the parking position. This makes it possible the driver to evacuate the vehicle.

Otherwise if it is determined that all of the externally and internally input activate request signals are in their inactive levels (the determination in step S330 is NO), the microcomputer 3 retries the monitoring operation in step S320 and the determining operation in step S330. If it is determined that all of the externally and internally input activate request signals are in their inactive levels (the retried determination in step S330 is NO), the microcomputer 3 goes to step S340.

In step S340, the microcomputer 3 accesses the activation-factor detecting unit 39, and, in the next step S350, determines whether the occurrence record of the activate request has been stored in the activation-factor detecting unit 39 based on the accessed result.

If it is determined that the occurrence record of the activate request has been stored in the activation-factor detecting unit 39 (the determination in step S350 is YES), the microcomputer 3 recognizes that at least one of the activate request signals had been in its active level. Thus, the microcomputer 3 proceeds to normal control operations to control the target corresponding to at least one of the activate request signals with its active level in common with the normal control operations set forth above in step S355.

Otherwise if it is determined that no occurrence record has been stored in the activation-factor detecting unit 39 (the determination in step S350 is NO), the microcomputer 3 recognizes that any cause probably permits the power supply circuit 7 to start to output the power supply voltages V7 to V9. Thus, the microcomputer 3 goes to step S360 and returns the standby signal V6 from its high level to its low level in step 26. S360. This allows the output of the power supply voltages V7 to V9 from the power supply circuit 7 to the microcomputer 3 to be interrupted after the predetermined period Td has elapsed since the low-level returning timing.

Specifically, the microcomputer 3 determines whether the power supply on the power supply circuit 7 is proper. If it is determined that the power supply on the power supply circuit 7 is improper, the microcomputer 3 returns the standby signal V6 from its high level to its low level to interrupt the power supply voltages V7 to V9 supplied from the power supply circuit 7. This can prevent the continuously wasted running of the microcomputer 3.

Next, the microcomputer operations set forth above will be described in detail using the timing chart illustrated in FIG. 5.

When electrical connection between the battery 5 and the ECU 1 is established so that the battery voltage V1 is supplied to the ECU 1, the power supply voltage V10 for the activate circuit 9 from the regulator 11 and the wakeup signal V5 for the power supply circuit 7 are respectively turned to their high levels at the timing t1. This is because the MOSFET 51 of the activate circuit 9 is in off state.

Thereafter, at the timing t2, when at least one of the exteriorly and internally activate request signals is turned to its active level (for example, the ignition switch signal V2 is turned to its high level in the first embodiment), the supply of the power supply voltages V7 to V9 from the power supply circuit 7 to the microcomputer 3 is started. Specifically, as described above, the output of the power supply voltages V7 to V9 is started in the order of the power supply voltage V7 for the memories at the timing t2, the power supply voltage V8 for the core 13 at the timing t3, and the power supply voltage V9 for the I/O 15 at the timing t4.

Thereafter, when the predetermined constant period Tpor for power-on reset has elapsed since the last supplied power supply voltage V9 reaches the corresponding threshold level L9, the power-on reset (POR) mode of the microcomputer 3 by the microcomputer monitoring unit 41 is reset (in other words, the reset signal V11 is turned from its low level to its high level) at the timing t5. This allows activation of the microcomputer 3.

When starting to operate, the microcomputer 3 turns the standby signal V6 from its low level to its high level (see step S310 of FIG. 4). For example, in the first embodiment, because the ignition switch signal V2 as activation factor is kept in its high level, the microcomputer 3 executes affirmative determination (see "YES" in step S330 of FIG. 4), thereby performing the normal control operations to control the target in step S355.

Thereafter, when the standby signal V6 is turned from its low level to its high level, the activate circuit 9 shifts into a normal operating mode so that the communication circuit 47 is allowed to operate and the activate request detecting unit 49 is not allowed to operate. The normal operating mode of the activate circuit 9 permits the MOSFET 51 to be continuously in on state. This allows the wakeup signal V5 from the activate circuit 9 to the power supply circuit 7 to be turned its low level Thereafter, when it is determined that all of the activate request signals are in their inactive levels at the timing t6 so that it is determined that the suspend condition in the microcomputer 3 is met, the standby signal V6 from the microcomputer 3 is turned from its high level to its low level (active level) at the timing t7 (see step S220 of FIG. 3).

The high level of the standby signal V6 permits the activate circuit 9 to shift into the power-consumption reducing mode so that the activate request detecting unit 49 is allowed to operate and the communication circuit 47 is not allowed to operate. The power-consumption reducing mode of the activate circuit 9 permits the MOSFET 51 to be turned to its off state. This allows the wakeup signal V5 from the activate circuit 9 to the power supply circuit 7 to be turned to its high level (inactive level).

When the predetermined period Td has elapsed since the low-level returning timing of the standby signal V6, the power supply voltages V7 to V9 are interrupted by the operations of the sleep/wakeup control unit 37 illustrated in FIG. 2. Specifically, as described above, the output of the power supply voltages V7 to V9 is interrupted in the order of the power supply voltage V9 for the I/O 15 at the timing t8, and the power supply voltages V8 and V7 respectively for the core 13 and the memories at the timing t9.

Note that, in FIG. 5, the reason that the level of the reset signal V11 decreases with decrease of the power supply voltage V9 is that the power supply circuit 7 uses the power supply voltage V9 as power supply for outputting the reset signal V11.

The interrupt of the power supply voltages V7 to V9 to the microcomputer 3 permits the ECU 11 to shift into the sleep mode (suspend mode). Thereafter, when the standby signal V6 is turned to its low level, the timer 43 starts to count the timer period.

When the predetermined timer period has elapsed since output of the standby signal V6 from the microcomputer 3, or when a pulse edge appears through at least one of the communication lines 45a and 45b, the wakeup signal V5 from the activate circuit 9 to the power supply circuit 7 is turned to its low level in the one-shot (monostable) mode at the timing t10.

Thereafter, when the wakeup signal V5 is turned to its low level, as illustrated in the timings t10 to t12, the supply of the power supply voltages V7 to V9 from the power supply circuit 7 to the microcomputer 3 are restarted.

Thereafter, when the predetermined constant period Tpor has elapsed since the last supplied power supply voltage V9 reaches the corresponding threshold level L9, the power-on reset (POR) mode of the microcomputer 3 by the microcomputer monitoring unit 41 is reset at the timing t13. This allows restart of the microcomputer 3.

When restarting, the microcomputer 3 turns the standby signal V6 from its low level to its high level (see step S310 of FIG. 4). At that time, all of the activate request signals are in their inactive levels, but, because the occurrence record representing that the wakeup signal V5 has been turned to its active level, the microcomputer 3 executes affirmative determination (see "YES" in step S350 of FIG. 4), thereby performing the normal control operations to control the target in step S355.

Thereafter, when the standby signal V6 is turned from its low level to its high level at the timing t13, the activate circuit 9 shifts from power-consumption reducing mode into normal operating mode that allows the wakeup signal V5 from the activate circuit 9 to the power supply circuit 7 to be turned to its low level at the timing t3.

Thereafter, at least one of the exteriorly and internally activate request signals is turned to its active level (for example, the ignition switch signal V2 is turned to its high level). The ignition switch signal V2 is turned to its low level at the timing t 14 after a predetermined period has elapsed since the high level turning timing of the ignition switch signal V2. This allows all of the exteriorly and internally activate request signals to be in their inactive levels so that it is determined that the suspend condition in the microcomputer 3 is satisfied. This causes the standby signal V6 from the microcomputer 3 to be turned to its low level at the timing t15.

Like the timings t7 to t9, the power supply voltages V7 to V9 from the power supply circuit 7 to the microcomputer 3 are interrupted, which allows the ECU 1 to shift into the sleep mode.

As described above, the ECU 1 according to the first embodiment is configured such that the standby signal V6 output from the microcomputer 3 is directly input, as a signal for interrupting the power supply voltages V7 to V9, to the power supply circuit 7. This allows ECU failure rate to decrease. This is because, as compared with an ECU in which a standby signal is input to a power supply circuit through another circuit, it is possible to prevent the power supply voltages V7 to V9 from being improperly interrupted due to another circuit failure. Specifically, the ECU 1 according to the first embodiment permits the possibility of ECU malfunction based on the power-supply voltage interruption to decrease.

Moreover, the power supply circuit 7 is designed to directly receive the externally input activate request signals in addition to the internally input activate request signal (wakeup signal V5) without involving the activate circuit 9. Even if activate circuit failure occurs, use of at least one of the externally input activate resent signals allows the microcomputer 3 to be activated, making it possible to prevent the ECU 1 from being completely inoperative. As set forth above, in the ECU 1 high reliability can be secured.

Moreover, in the ECU 1, the power-supply control function (sleep/wakeup function) has been installed in the power supply circuit 7 as the sleep/wakeup control unit 37. This allows the need for providing a plurality of semiconductor circuits each with power-supply control function to be eliminated, making it possible to improve the versatility and scalability of the ECU 1.

Furthermore, in the ECU 1, the power supply circuit 7 is configured such that the number of externally activate request signals are input thereto. This allows factors to activate the microcomputer 3 to increase, making it possible to further reduce the possibility of difficulty for the power supply circuit 7 to activate the microcomputer 3.

The microcomputer monitoring unit 41 that has been installed in the power supply circuit 7 allows an out-of-control microcomputer 3 to immediately return from its out-of-control state to its normal state.

Still furthermore, in the first embodiment, when resuming, the microcomputer 3 monitors the activate request signals being input to the power supply circuit 7 (see step S320 in FIG. 4). Then, when determining that all of the input activate request signals are in their inactive levels (see "NO" in step S330), and that no occurrence record has been stored in the activation-factor detecting unit 39 (see "NO" in step S350), the microcomputer 3 is configured to output the standby signal V6 (see step S360).

This allows the microcomputer 3 to determine that any cause permits the power supply circuit 7 to start to output the supply of the power supply voltages V7 to V9 when no activate request signals are in their active levels. Thus, it is possible to interrupt the output of the power supply voltages V7 to V9, thereby preventing the continuously wasted running of the microcomputer 3.

In addition, when determining that the suspend condition is satisfied, the microcomputer 3 saves specific data stored in the SRAM 19b to the flash ROM 17 (see step S210 of FIG. 3), and outputs the standby signal V6 after the specific data save has been completed (see step S220).

This makes unnecessary to execute power-supply backup for continuously supplying a power supply voltage to the SRAM 19b even in the sleep mode, thus to further reduce power consumption of the ECU 1

Moreover, in the first embodiment, when receiving the standby signal V6 from the microcomputer 3 (see "YES" in step S110 of FIG. 2), the power supply circuit 7 determines whether at least one of the activate request signals is turned to the corresponding active level within a predetermined period Td from the low-level standby signal detecting timing without immediately interrupting the output of the power supply voltages V7 to V9 (see step S120 in FIG. 2).

If it is determined that no activate request signals are turned to the corresponding active levels within the predetermined period Td from the low-level standby signal detecting timing, (see "NO" in step S120), the power supply circuit 7 interrupts the output of the power supply voltages V7 to V9 to the microcomputer 3 (see step S130).

Otherwise if it is determined that at lest one of the activate request signals is turned to the corresponding active level within the predetermined period Td (see "YES" in step S120), the power supply circuit 7 resets the microcomputer 3 to its initial state without interrupting the output of the power supply voltages V7 to V9, thereby restarting the microcomputer 3 therefrom.

As set forth above, if at least one of the activate request signals is turned to the corresponding active level within the predetermined period Td, it is possible to immediately restart the microcomputer 3 without interrupting the output of the power supply voltages V7 to V9.

The ECU 1 according to the first embodiment shifts its operating mode into the power-consumption reducing mode in response to output of the standby signal V6 from the microcomputer 3; this power-consumption reducing mode is to reduce power consumption of the communication circuit 47. This allows power consumption of the ECU 1 in the sleep mode to further decrease.

Moreover, the standby signal V6 output from the microcomputer 3 has the low level as active level, more reducing power consumption of the ECU 1 in the sleep mode.

Furthermore, in the first embodiment, when the timer 43 detects that the predetermined timer period has elapsed since output of the standby signal V6 from the microcomputer 3, the activate circuit 9 determines that the activation condition to activate the microcomputer 3 is satisfied. Then, the activate circuit 9 outputs the wakeup signal V5 with the active level (low level) to the power supply circuit 7.

This configuration of the activate circuit 9 allows diagnosis of an evaporative emission control system whose structure is typically disclosed in U.S. patent application Ser. No. 2003/0093189A1 corresponding to Japanese Unexamined Patent Publication No. 2003-139874.

Specifically, in check of an evaporative emission control system of this type, while a system for collecting fuel evaporative emissions escaping from the fuel tank is closed, pressurization or reduction in the system to create variation in pressure in the evaporative emission control system allows air-tightness in the system to be checked. Immediately after the engine has been operated for a long period under high-load conditions, it is difficult to obtain an accurate result of the check because the fuel in the fuel tank easily evaporates.

Accordingly, after a constant period has elapsed from stop of the engine, such as turning-off of the ignition switch, a microcomputer checks air-tightness in the evaporative emission control system.

In this case, during the engine stop, such as off state of the ignition switch, if the microcomputer continuously operates to count the constant period set forth above, it would be difficult to control power consumption during the off state of the ignition switch, resulting in battery depletion.

In view of the problem set forth above, when the microcomputer 3 of the ECU 1 is used to check air-tightness in the evaporative emission control system, the power supply voltages V7 to V9 from the power supply circuit 7 are interrupted in response to input of the standby signal V6 from the microcomputer 3 according to turning-off of the ignition switch 29. Thereafter, the timer 43 detects whether the predetermined timer period has elapsed since the interruption of the power supply voltages V7 to V9 to the microcomputer 3. If it is determined that the predetermined timer period has elapsed, the power supply voltages V7 to V9 are supplied to the microcomputer 3 so that the microcomputer 3 performs the airtightness checking operations in the evaporative emission control system. Because the power supply voltages V7 to V9 to the microcomputer 3 are interrupted during the off state of the ignition switch 29, it is possible to prevent battery depletion.

Next, other functions of the power supply circuit 7 will be described.

Figure 6:
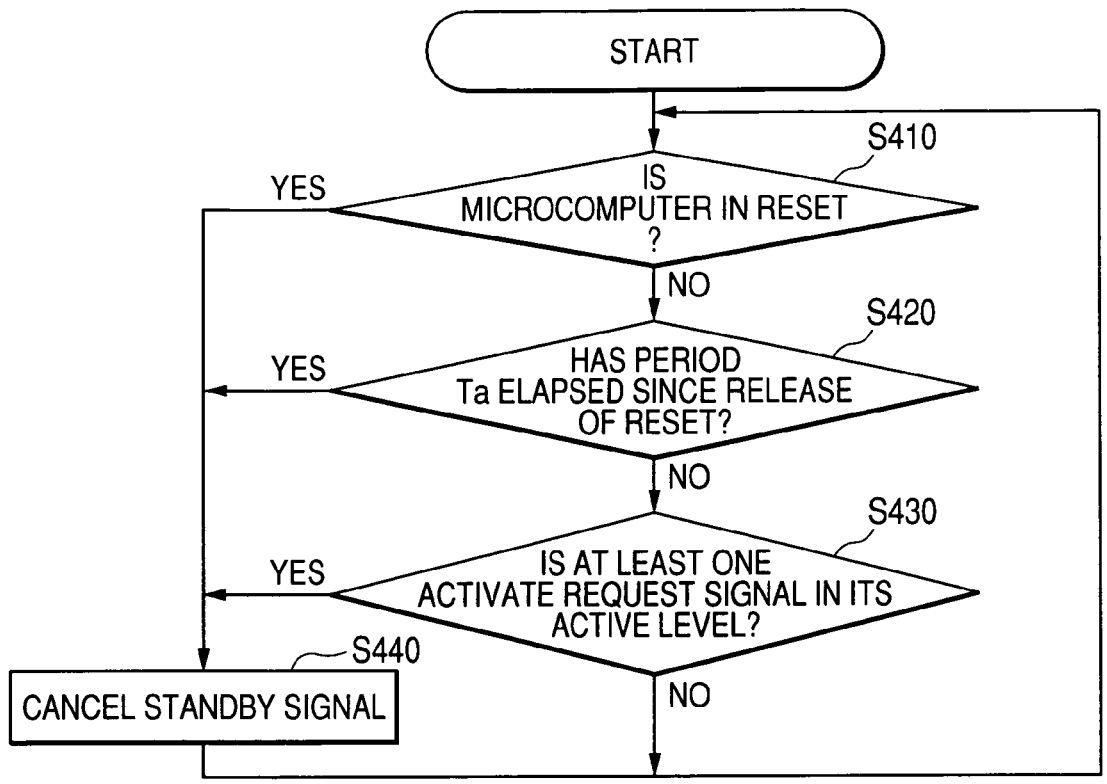
FIG. 6 is a flowchart schematically illustrating operations executed by the sleep/wakeup control unit according to the first embodiment.

FIG. 6 schematically illustrates operations executed by the sleep/wakeup control unit 37 in accordance with at least one program installed in, for example, the control unit 37.

As illustrated in FIG. 6, the sleep/wakeup control unit 37 determines whether the microcomputer monitoring unit 41 keeps reset of the microcomputer 3, in other words, the reset signal V11 holds its low level, based on a notification sent from the microcomputer monitoring unit 41 in step S410.

If it is determined that the reset signal V11 holds its low level (the determination in step S410 is YES), the sleep-wakeup control unit 37 cancels the standby signal V6 in step S440. Note that the "cancel of the standby signal V6" means that turning of the standby signal V6 from its high level to its low level is ignored so as not to interrupt the output of the power supply voltages V7 to V9.

Specifically, because the microcomputer 3 improperly operates during reset, the power supply circuit 7 has ignored the standby signal V6 output from the microcomputer 3 within the period for which the microcomputer 3 has been reset. This allows the power supply circuit 7 to improperly interrupt the output of the power supply voltages V7 to V9.

In addition, the sleep/wakeup control unit 37 determines whether a predetermined period Ta has elapsed since the release of the microcomputer's reset, in other words, the turning of the reset signal V11 from its low level to its high level in step S420. If the standby signal V6 is sent from the microcomputer 3 to the sleep/wakeup control unit 37 within the predetermined period Ta, the determination in step S420 is YES so that the standby signal V6 is canceled by the sleep/wakeup control unit 37 in step S440.

Specifically, because a certain degree of time is required until the microcomputer 3 becomes a state that allows proper output of the standby signal V6, the power supply circuit 7 has ignored the standby signal V6 output from the microcomputer 3 until the predetermined period Ta corresponding to the certain degree of time has elapsed. This further prevents the power supply circuit 7 from improperly interrupting the output of the power supply voltages V7 to V9.

Moreover, the sleep/wakeup circuit 37 determines whether at least one of the activate request signals is in its active level based on a notification sent from the microcomputer monitoring unit 41 in step S430.

If it is determined that at least one of the activate request signals is in its active level (the determination in step S430 is YES), the sleep-wakeup control unit 37 cancels the standby signal V6 in step S440.

This can prevent the power supply voltages V7 to V9 to the microcomputer from being interrupted in order to continuously operate the microcomputer 3.

Figure 7:
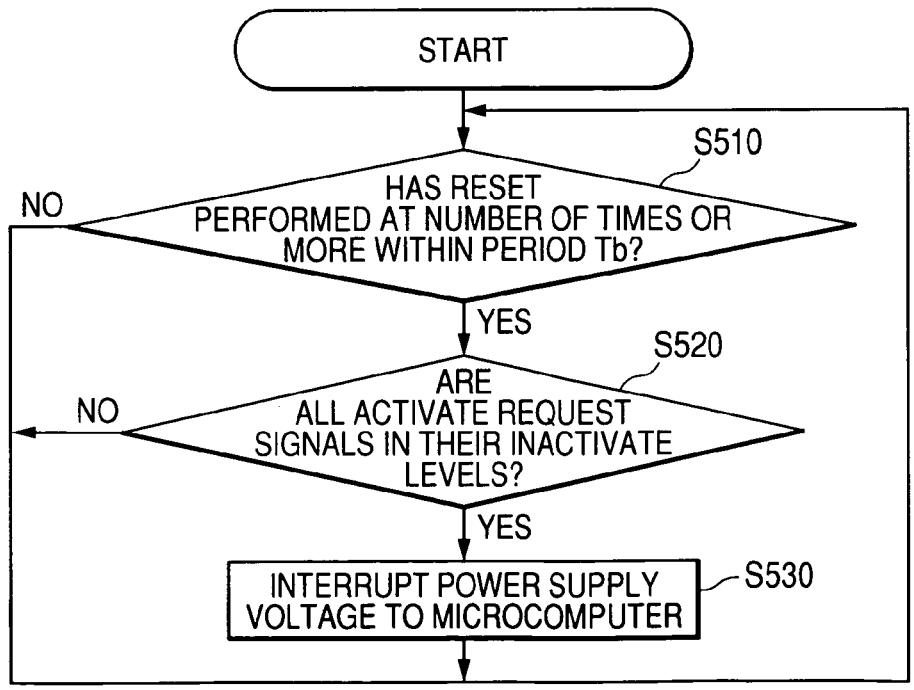
FIG. 7 is a flowchart schematically illustrating operations executed by the sleep/wakeup control unit 37 according to the first embodiment.

Next, FIG. 7 schematically illustrates operations executed by the sleep/wakeup control unit 37 in accordance with at least one program installed in, for example, the control unit 37.

As illustrated in FIG. 7, the sleep/wakeup control unit 37 determines whether the microcomputer monitoring unit 41 has performed reset of the microcomputer 3 at a predetermined number of times or more within a predetermined period Tb based on a notification sent from the monitoring unit 41 in step S510.

If it is determined that the monitoring unit 41 has performed reset of the microcomputer 3 at the predetermined number of times or more within the predetermined period Tb (the determination in step S510 is YES), the sleep/wakeup control unit 37 determines whether all of the activate request signals are in their inactive levels based on a notification sent from the monitoring unit 41 in step S520.

If it is determined that all of the activate request signals are in their inactive levels (the determination in step S520 is YES), the sleep/wakeup control unit 37 outputs the output disable signal to the power-supply control unit 35, thereby causing it to interrupt the output of the power supply voltages V7 to V9 to the microcomputer 3 in step S530.

This allows the battery voltage 5 from dieing when the microcomputer 3 runs away out of control so as not to return its normal operating state.

In addition, in the ECU 1 according to the first embodiment, no signals with their high levels are output from the respective activate circuit 9 and the power supply circuit 7 during interruption of the power supply voltage output to the microcomputer 3 by the power supply circuit 7. This can prevent improper voltage being directed to the microcomputer 3 from the power supply circuit 7 during interruption of the power supply voltage output to the microcomputer 3 by the power supply circuit 7.

Figure 8:
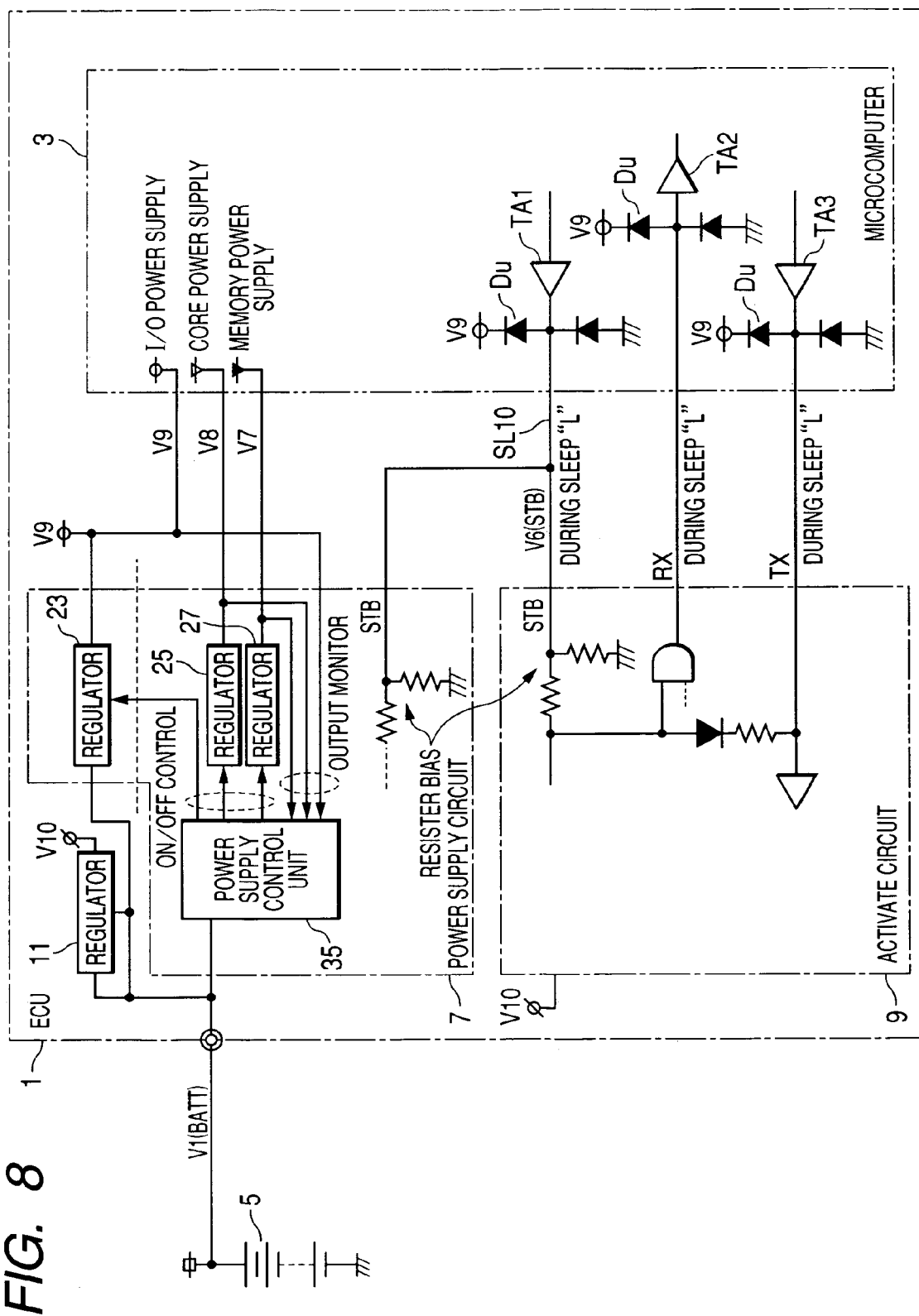
FIG. 8 is a circuit diagram schematically illustrating protect elements provided in the microcomputer according to the first embodiment.

Specifically, as illustrated in FIG. 8, when the microcomputer 3 has a normal hardware structure, the microcomputer 3 is provided with diodes Du. The cathodes of the diodes Du are connected to power supply lines connected to the regulator 23 for the supply of the power supply voltage V9, and the anodes thereof to respective signal lines SL10, RX, and TX connected to input/output terminals TA1, TA2, and TA3. The diodes Du serve as protect elements for prevent the input/output terminals TA1, TA2, and TA3 from being applied thereto excessive input voltage.

As illustrated in FIG. 8, the circuit structures of the power supply circuit 7 and the activate circuit 9 are preferably biased (see FIG. 8). Therefore, while the power supply voltages V7 to V9 to the microcomputer 3 are interrupted, when a signal with its high level is input from any one of the power supply circuit 7 and the activate circuit 9 to the input/output terminals TA1, TA2, and TA3, the high level signal may be directed to the power supply lines connected to the regulator 23 for the supply of the power supply voltage V9. This may cause wasted power consumption in the microcomputer 3, and/or the microcomputer 3 to improperly operate.

During interruption of the power supply voltage output to the microcomputer 3 by the power supply circuit 7, the ECU 1 is configured such that no signals with their high levels are output from the respective activate circuit 9 and the power supply circuit 7. This can prevent improper voltage being directed to the microcomputer 3 from the power supply circuit 7, making it possible to achieve wasted power consumption in the microcomputer 3 and/or the microcomputer's improper operation due to the high-level signals.

Next, a first modification of the first embodiment will be described hereinafter.

Figure 9:
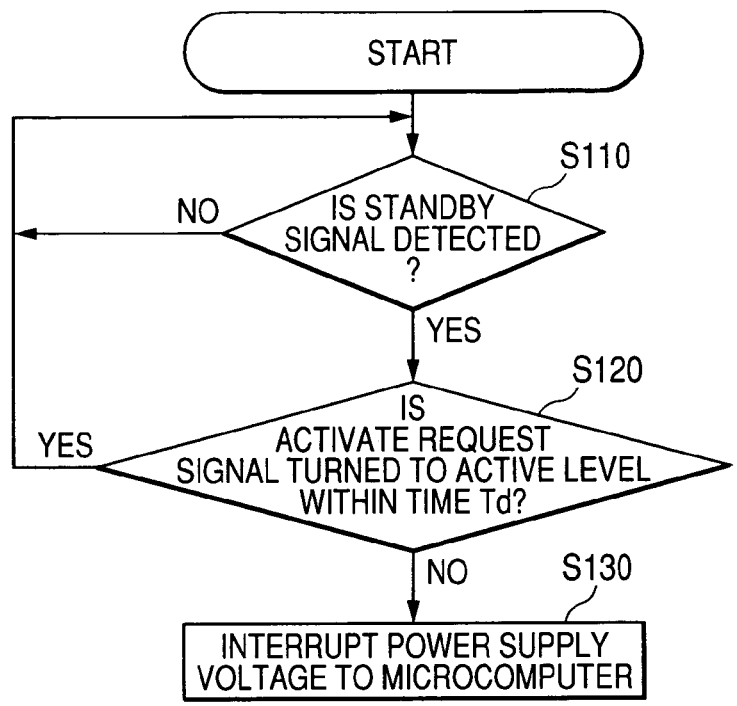
FIG. 9 is a flowchart schematically illustrating operations of the sleep/wakeup control unit according to a first modification of the first embodiment.

In an ECU 1 according to the first modification, as compared with the first embodiment, the sleep/wakeup control unit 37 according to the first modification executes the following operations illustrated in the flowchart of FIG. 9 in place of that of FIG. 2. Specifically, the sleep/wakeup control unit 37 is programmed to execute the following operations in the flowchart. Note that, in FIGS. 2 and 9, identical reference characters are assigned to identical operations.

Specifically, when detecting that the standby signal V6 is turned to its low level from its high level (the determination in step S110 of FIG. 2 is YES), and when determining that at lest one of the activate request signals is turned to the corresponding active level within the predetermined period Td from the low-level standby signal detecting timing (the determination in step S120 is YES), the sleep/wakeup control unit 37 returns to the operation in step S110 without resetting the microcomputer 3.

In contrast, if it is determined that no activate request signals are turned to the corresponding active levels within the predetermined period Td (the determination in step S120 is NO), the sleep/wakeup control unit 37 causes the power-supply control unit 35 to interrupt the output of the power supply voltages V7 to V9 to the microcomputer 3 (see step S130).

Figure 10:
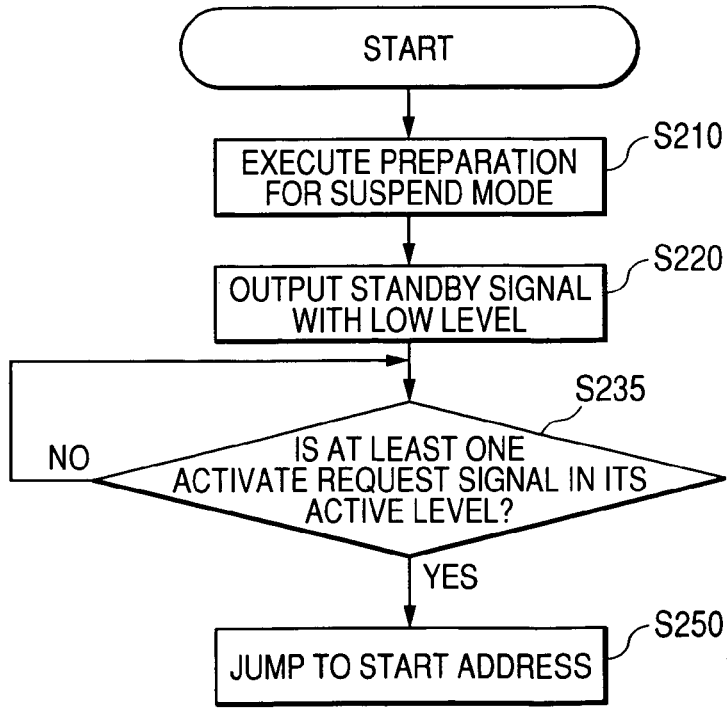
FIG. 10 is a flowchart schematically illustrating operations to be executed by the microcomputer when the microcomputer determines that suspend condition in the microcomputer is satisfied according to the first modification of the first embodiment.

Moreover, in the ECU 1 according to the first modification, as compared with the first embodiment, the microcomputer 3 according to the first modification executes the following operations illustrated in the flowchart of FIG. 10 in place of that of FIG. 3 when determining that suspend condition therein is satisfied. Note that, in FIGS. 3 and 10, identical reference characters are assigned to identical operations.

Specifically, after outputting the standby signal V6 with its low level (active level) in step S220, the microcomputer 3 repeatedly determines whether at least one the activate request signals input to the power supply circuit 7 is in its active level in step S235. If it is determined that at least one the activate request signals input to the power supply circuit 7 is in its active level (the determination in step S235 is YES), the microcomputer 3 goes to step S250. In step S250, the microcomputer 3 causes its execution location to jump to a start address of a program stored in, for example, the flash ROM 17 from which the microcomputer 3 should execute at initial start up.

The ECU 1 according to the first modification also allows the microcomputer 3 to immediately restart without interrupting the output of the power supply voltages V7 to V9 thereto if at least one of the activate request signals is turned to its active level within the predetermined period Td from the output of the standby signal V6 by the microcomputer 3.

This is because, if at least one of the activate request signals is turned to its active level within the predetermined period Td for which the power supply voltages are continued, the microcomputer 3 determines it in step S235, thereby executing the program at initial start up from the start address thereof.

Next, a second modification of the first embodiment will be described hereinafter.

Figure 11:
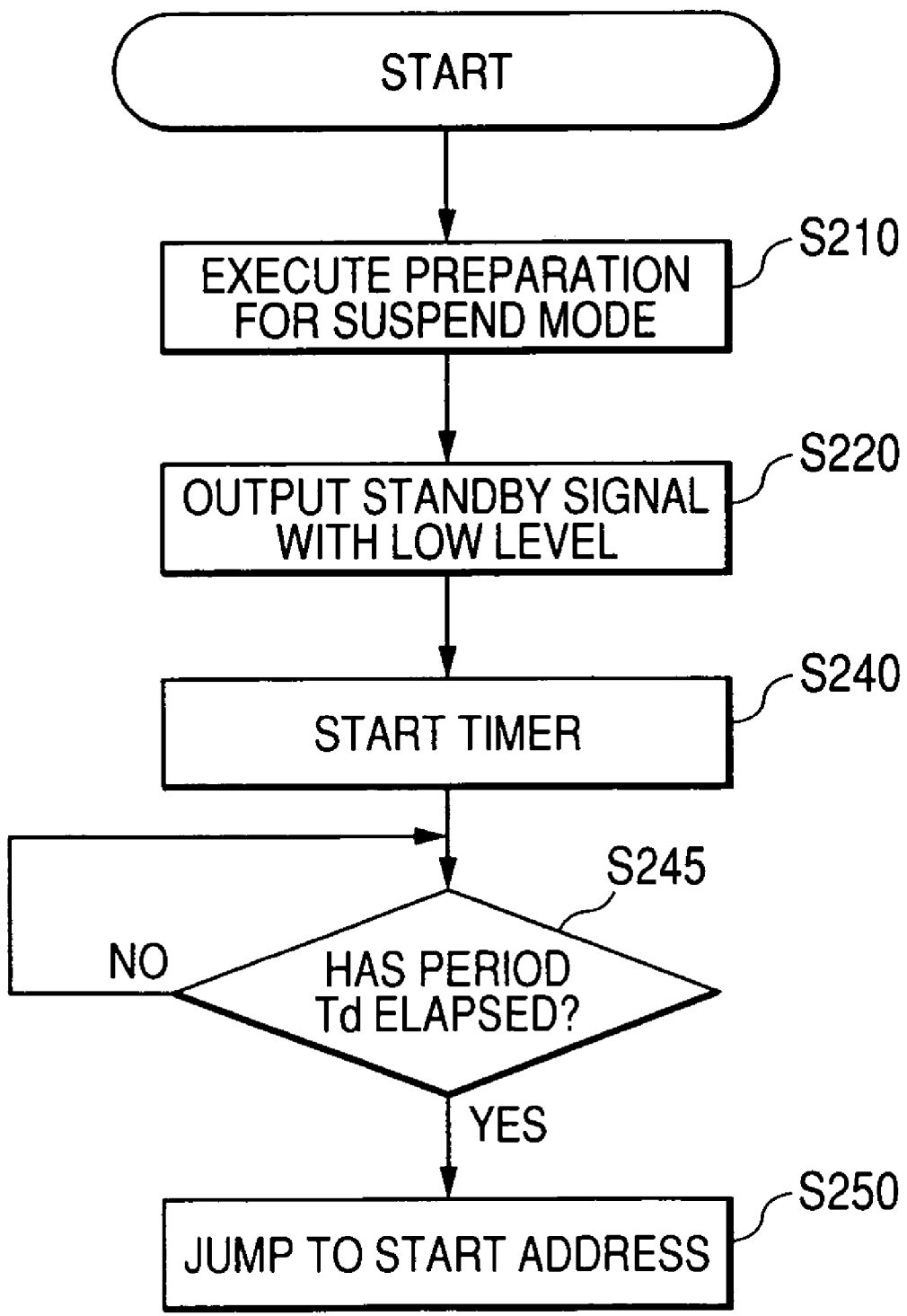
FIG. 11 is a flowchart schematically illustrating operations to be executed by the microcomputer when the microcomputer determines that suspend condition in the microcomputer is satisfied according to a second first modification of the first embodiment.

In an ECU 1 according to the second modification, as compared with the first modification, the microcomputer 3 according to the second modification executes the following operations illustrated in the flowchart of FIG. 11 in place of that of FIG. 10 when determining that suspend condition therein is satisfied. Note that, in FIGS. 10 and 11, identical reference characters are assigned to identical operations.

Specifically, after outputting the standby signal V6 with its low level (active level) in step S220, the microcomputer 3 starts software timer to measure a period elapsing from the output of the standby signal V6, in other words, counts up its clock to measure the period elapsing from the output of the standby signal V6 in step S240.

Next, the microprocessor 3 determines whether a threshold period, which is longer than the predetermined period Td, has elapsed from the output of the standby signal V6 based on the measured period in step S245, and waits until affirmative determination in step S245 is established.

If it is determined that the threshold period has elapsed (the determination in step S245 is affirmative), the microcomputer 3 goes to step S250. In step S250, the microcomputer 3 causes its execution location to jump to a start address of a program stored in, for example, the flash ROM 17 from which the microcomputer 3 should execute at initial start up.

The ECU 1 according to the second modification also permits the microcomputer 3 to immediately restart without interrupting the output of the power supply voltages V7 to V9 thereto if at least one of the activate request signals is turned to its active level within the predetermined period Td from the output of the standby signal V6 by the microcomputer 3.

This is because, if at least one of the activate request signals is turned to its active level within the predetermined period Td, the supply of the power supply voltages are continued to the microcomputer 3. This allows the microcomputer 3 to determine that the threshold period has elapsed in step S245, thereby executing the program at initial start up from the start address thereof.

Second Embodiment

Figure 12:
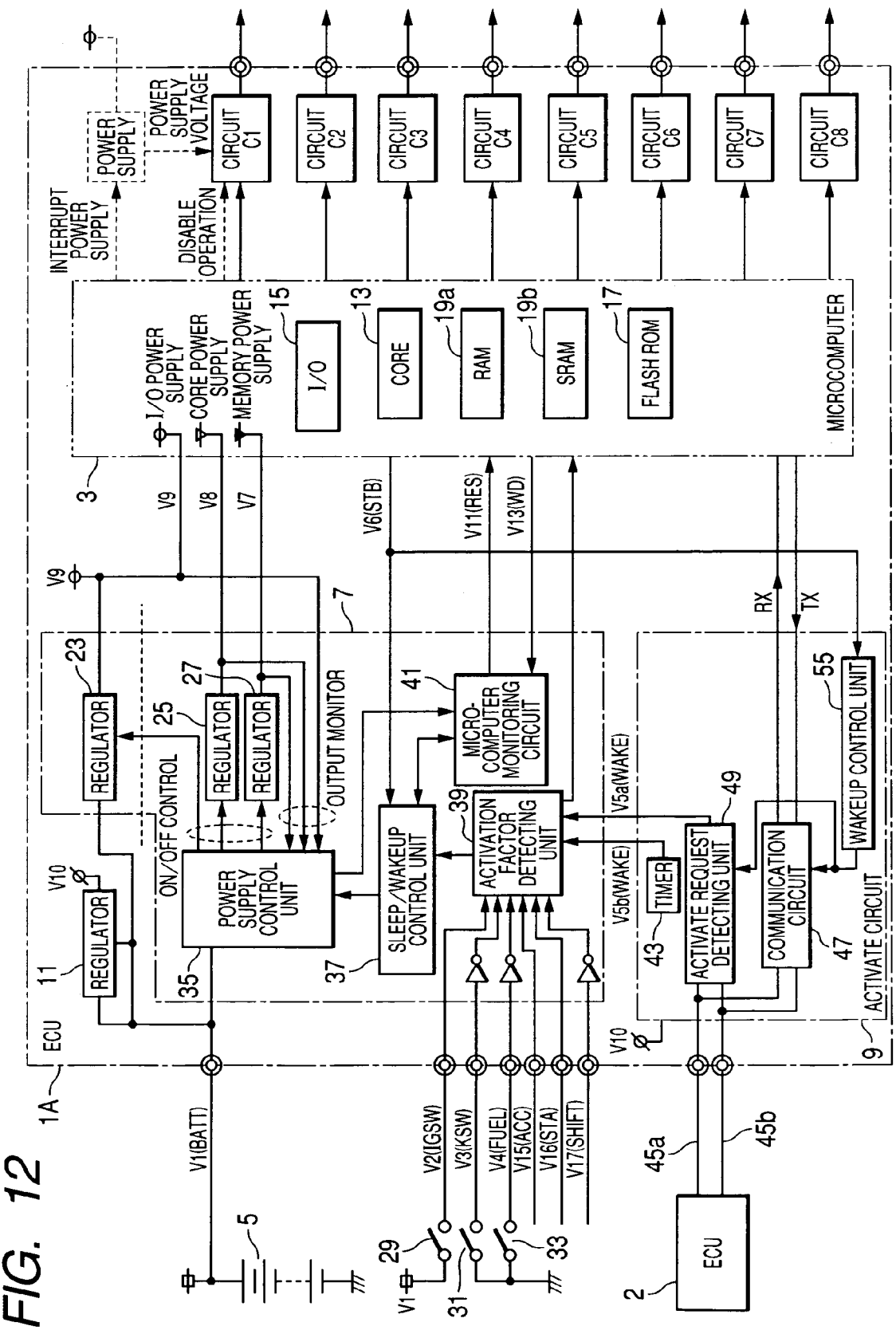
FIG. 12 is a circuit diagram schematically illustrating the structure of an electronic control unit according to a second embodiment of the present invention.

FIG. 12 schematically illustrates an ECU according to a second embodiment of the present invention. Note that like reference characters are assigned to like parts in FIGS. 1 and 12 so that descriptions of the parts will be omitted.

As compared with the ECU 1, an ECU 1A of the second embodiment specifically has the following points:

First, when detecting that the predetermined timer period has elapsed since change of the standby signal V6 from its high level to its low level, the timer 43 of the activate circuit 9 according to the second embodiment outputs a wakeup signal V5b to the power supply circuit 7 as one of the activate request signals.

Similarly, when detecting that a pulse edge appears through at least one of the communication lines 45a and 45b during the standby signal V6 being in its low state, the activate request detecting unit 49 outputs a wakeup signal V5a to the power supply circuit 7 as one of the activate request signals.

That is, in the second embodiment, there are two activate request signals output from the activate circuit 9 to the power supply circuit 7. In a different point of view, the respective timer 43 and activate request detecting unit 49 serve as activate circuits.

Note that the wakeup signals V5a and V5b have their low levels as active level, and are output in one-shot (monostable) mode from the timer 43 and activate request detecting unit 49, respectively. The activation factor detecting unit 39 is operative to:

send, to the sleep/wakeup control unit 37, the notification representing that at least one of the activate request signals including the wakeup signals V5a and V5b is turned to the corresponding active level; and store therein record information representing that at least one of the activate request signals including the wakeup signals V5a and V5b is turned to the corresponding active level and allowing identification of which activation request signal is turned to the corresponding active level.

Like the first embodiment, the wakeup signals V5a and V5b are configured to be input to the microcomputer 3 so that the microcomputer 3 monitors the states of them.

Note that, in FIG. 12, illustration of the switches 71 to 73 is omitted.

As schematically described in the first embodiment, the ECU 1A includes eight control functions (e.g. immobilizer control function, accessory control function, main-relay control function, engine control function, fuel-tank control function, shift-lock control function, diagnosis control function, and reprogram control function). These functions are listed in row in the top of a table illustrated in FIG. 13.

As illustrated in FIG. 12, the ECU 1A also includes eight circuits C1 to C8 connected respectively to the microcomputer 3 and configured to execute the eight functions, respectively.

Specifically, the circuits C1, C2, C3, and C4 are designed to implement the immobilizer control function, the accessory control function, the main-relay control function, and the engine control function, respectively. Similarly, the circuits C5, C6, C7, and C8 are designed to implement the fuel-tank control function, the shift-lock control function, the diagnosis control function, and the reprogram control function, respectively.

In FIG. 13, eights activate request signals (e.g. the key switch signal V3, the accessory switch signal V15, the ignition switch signal V2, the starter switch signal V16, the wakeup signal V5a, the fuel filler lid opener signal V4, the wakeup signal V5b, and the shift lock release signal V17) to be input to the power supply circuit 7 are also listed in column in the left of the table illustrated in FIG. 13.

Specifically, the table schematically illustrates that which control function should be executed when each of the activate request signals is turned to its corresponding active level as circled marks associated with corresponding signals and control functions.

Note that the immobilizer control includes antitheft control. Specifically, when the ignition key is inserted into the key cylinder by the driver, the ECU 1 communicates, through the communication lines 45a and 45b, with an other ECU that has registered therein an identifier of the ignition key to check whether an identifier of the inserted ignition key against the registered identifier. When it is determined that the identifier of the inserted ignition key matches that registered in the other ECU, such as an immobilizer ECU, the ECU 1 allows the engine to start up. Moreover, the communications between the ECU 1 and the immobilizer ECU are continued after turning on of the ignition switch 29 or the starter switch 72.

For these reasons, as illustrated in FIG. 13, the immobilizer control is carried out while at least one of the key switch signal V3, the ignition switch signal V2, and the starter switch signal V16 is in its active level.

The accessory control includes control for supplying power supply voltages and/or giving instructions to target accessory devices that should operate during the on state of the accessory switch 71, such as an audio system and instrument panel devices.

The accessory devices normally include at least one device that should operate dung the on state of the starter switch 72, and also includes at least one device that should operate in response to the activate request signal sent from an other device connected to the communication lines 45a and 45b. Moreover, the accessory switch 72 is in on state during on state of the ignition switch 29 so that the power supply voltages are supplied to the accessory devices.

For these reasons, as illustrated in FIG. 13, the accessory control is carried out while at least one of the accessory switch signal V15, the ignition switch signal V2, the starter switch signal V16, and the wakeup signal V5a is in its active level.

The main-relay control includes control for turning on a main relay that allows a power supply voltage fed from the battery 5 to be supplied to the other devices including other ECUs when at least one of the ignition switch and the starter switch 72 is in on state.

For this reason, as illustrated in FIG. 13, the main-relay control is carried out while at least one of the ignition switch signal V2 and the starter switch signal V16 is in its active level.

The engine control includes control for engine starting and engine operating during on state of at least one of the ignition switch 29 and the starter switch 72.

For this reason, as illustrated in FIG. 13, the engine control is carried out while at least one of the ignition switch signal V2 and the starter switch signal V16 is in its active level.

The fuel-tank control includes control for controlling devices associated with the fuel tank, such as a fuel pump delivering fuel from the fuel tank to the engine and an actuator for adjusting the internal pressure in the fuel tank. Specifically, the fuel-tank control includes control for opening the fuel filler opening after adjusting the internal pressure in the fuel tank when the fuel lid opener switch 33 is turned to on, and control for checking the evaporate emission control system, in other words, for checking air-tightness in the evaporate emission control system.

For these reasons, as illustrated in FIG. 13, the fuel-tank control is carried out while at least one of the ignition switch signal V2, the starter switch signal V16, the fuel lid opener switch signal V4, and the wakeup signal V5b is in its active level.

The shift-lock control allows the transmission to be shift from the parking position to another position during on state of at least one of the ignition switch 29 and the starter switch 72 when a predetermined operation condition is satisfied. In addition, the shift-lock control allows the transmission to be shift from the parking position to the neutral position during on state of the shift lock release switch 73 even in cases of off state of each of the ignition switch 29 and the starter switch 72.

For this reason, as illustrated in FIG. 13, the shift-lock control is carried out while at least one of the ignition switch signal V2, the Starter switch signal V16, and the shift-lock release switch signal V17 is in its active level.

The diagnosis control includes control for:
performing failure diagnosis of each of the elements of the ECU 1A and/or other devices installed in the vehicle;
storing a result of the failure diagnosis; and
returning data and/or the result of the failure diagnosis when receiving data request sent from a failure diagnosis test unit disposed at the exterior of the vehicle; this data to be returned corresponds to the data request.

For these reasons, as illustrated in FIG. 13, the diagnosis control is carried out while at least one of the ignition switch signal V2, the starter switch signal V16, and the wakeup signal V5a is in its active level.

The reprogram control includes control for rewriting control programs into new control programs sent from a program rewriting unit prepared at the exterior of the vehicle when the ECU 1A receives a program rewriting request sent therefrom during the on state of at least one of the ignition switch 29 or the starter switch 72. For example, the control programs have been installed in, for example, the flash ROM 17; these control programs correspond to the control functions set forth above, respectively.

In addition, the reprogram control includes control for rewriting the control programs into new control programs sent from the program rewriting unit even in cases of off state of at least one of the ignition switch 29 or the starter switch 72.

For these reasons, as illustrated in FIG. 13, the reprogram control is carried out while at least one of the ignition switch signal V2, the starter switch signal V16, and the wakeup signal V5a is in its active level.

Figure 14:
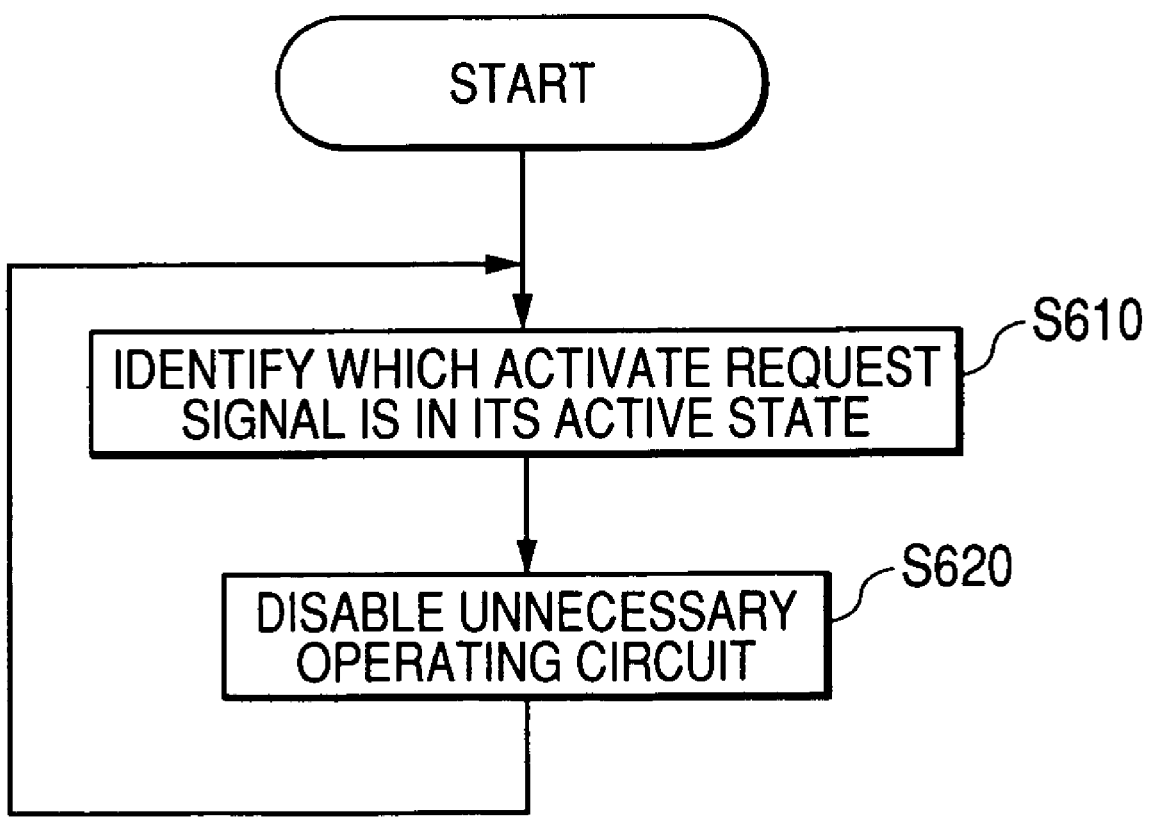
FIG. 14 is a flowchart schematically illustrating unnecessary operation disabling operations to be executed by the microcomputer according to the second embodiment.

Next, in the ECU 1A according to the second embodiment, after proceeding the normal control operations according to the affirmative determination in step S330 or S350, the microcomputer 3 concurrently performs unnecessary operation disabling operations illustrated in FIG. 14 in accordance with, for example, at least one program installed in the flash ROM 17.

Specifically, as the unnecessary operation disabling operations, the microcomputer 3 identifies which activate request signal is in its active state in all of the eight activate request signals in step S610.

To describe it in detail, as at least one of the activate request signals output from the activate circuit 9 in one-short mode, that is, at least one of the wakeup signals V5a and V5b, the microcomputer 3 reads out the occurrence record of the activate signals from the activation factor detecting unit 39. Next, the microcomputer 3 determines whether at least one of the wakeup signals V5a and V5b has or had been in its active level based on the readout occurrence record.

As at least one of the activate request signals that are kept in its active level during on state of the corresponding switch, that is, at least one of the switch signals V2 to V4, and V15 to V17, the microcomputer 3 can use the following two identifying operations.

As one of the two identifying operations, the microcomputer 3 determines whether at least one of the switch signals V2 to V4, and V15 to V17 had been in its active level based on the readout occurrence record.

As the other thereof, the microcomputer 3 determines whether at least one of the switch signals V2 to V4, and V15 to V17 had been in its active level by monitoring the current level of at least one of the switch signals V2 to V4, and V15 to V17.

After the identifying operation, the microcomputer 3 forcibly disables, as unnecessary operating circuits, the remaining circuits except for at least one circuit corresponding to at least one of the switch signals; this at least one of the switch signals is determined such that it has or had been in its active level in step S620, returning to step S610.

For example, if it is determined that the key switch signal V3 is or was only in its active level in step S610, because the key switch signal V3 corresponds to the immobilizer control function (see FIG. 13), the microcomputer 3 forcibly disables, as an unnecessary operating circuit, the remaining circuits C2 to C8 except for the circuit C1 corresponding to the key switch signal V3 in step S610.

For another example, if it is determined that the key switch signal V3 and the accessory switch signal V15 are or were only in their active levels in step S610, because the accessory switch signal V15 corresponds to the accessory control function (see FIG. 13), the microcomputer 3 forcibly disables, unnecessary operating circuits, the remaining circuits C3 to C8 except for the circuits C1 and C2 corresponding to the key switch signal V3 and the accessory switch signal V15, respectively, in step S610.

As specific operations of the microcomputer 3 in step S620 to disable an unnecessary operating circuit(s), as illustrated by dash line in FIG. 12, the microcomputer 3 can interrupt a power supply voltage to be fed to the unnecessary operating circuit(s). In another method, the microcomputer can output a signal indicative of operating disable to the unnecessary operating circuit(s). As the signal indicative of operating disable, a disable signal generated by changing its inactive level of an enable signal can be used. Moreover, as the signal indicative of operating disable, a mode shift signal allowing the unnecessary operating circuit(s) to be shifted from its normal operating mode to its sleep mode (low-power consumption mode) can be also used.

Specifically, the ECU 1A according to the second embodiment is configured to allow at least one circuit corresponding to at least one activate request signal that is or was in its active level to operate, but the remaining circuit(s) corresponding the remaining activate request signal(s) that is or was not in its active level to be forcibly disabled.

Thus, it is possible to securely disable at least one circuit that unnecessary to be operated, thereby effectively reducing power consumption of the running microcomputer 3.

Third Embodiment

An ECU according to a third embodiment of the present invention identically has the same hardware structure as that of the ECU 1A according to the second embodiment, and therefore, like reference characters are assigned to like parts between the second and third embodiments.

In view of software structure, the ECU 1A according to the third embodiment has the following different points as compared with the ECU 1A according to the second embodiment.

Specifically, after proceeding the normal control operations according to the affirmative determination in step S330 or S350, the microcomputer 3 executes a main process illustrated in FIG. 15 in place of FIG. 14 in accordance with, for example, at least one program installed in, for example, the flash ROM 17.

In addition, in the third embodiment, as illustrated at the top of the table in FIG. 13, flags F1, F2, . . . , and F8 are allocated to the immobilizer control function, the accessory control function, . . . , and the reprogram control function, respectively.

In the main process illustrated in FIG. 15, the microcomputer 3 identifies which activate request signal is in its active state in all of the eight activate request signals in step S710, which is similar to the operation in step S610 of FIG. 14.

Next, the microcomputer 3 sets at least one flag to at least one control function corresponding to at least one of the switch signals; this at least one of the switch signals is determined such that it has or had been in its active level in step S720. For example, in the third embodiment, the microcomputer 3 sets at least one flag with "1" to at least one control function corresponding to at least one of the switch signals.

In steps S730, S740, S750, S760, S770, S780, S790, and S800, the microcomputer 3 determines whether the corresponding flags F1, F2, F3, F4, F5, F6, F7, and F8 are set, in other words, whether the corresponding flags F1, F2, F3, F4, F5, F6, F7, and F8 are "1".

If it is determined that at least one flag Fn (n is any one of 1 to 8) is set, the microcomputer 3 executes control operations required to implement the control function corresponding to at least one flag Fn in any one of steps S735, S745, S755, S765, S775, S785, S795, and S805. That is, the microcomputer 3 skips control operations required to implement the remaining control functions to which no flags are set.

Specifically, the microcomputer 3 disables execution of control operations required to implement the control functions except for at least one control function corresponding to at least one activate request signal that is determined to have its active level by means of branch determinations of step S730, S740, S750, S760, S770, S780, S790, and S800.

For example, if it is determined that the key switch signal V3 is or was only in its active level in step S710, the flag F1 of the immobilizer control function corresponding to the key switch signal V3 is only set (see step S730 in FIG. 15). In all of the control operations for implementing the control functions, immobilizer control operations required to implement the immobilizer control function corresponding to the flag F1 is only executed (see step S735).

As another example, if it is determined that the key switch signal V3 and the accessory switch signal V15 are or were only in their active levels in step S710, the flag F1 and the flag F2 of the accessory control function corresponding to the accessory switch signal V15 are only set (see steps S730 and S740 in FIG. 15). In all of the control operations for implementing the control functions, immobilizer control operations required to implement the immobilizer control function corresponding to the flag F1 is executed (see step S735), and accessory control operations required to implement the accessory control function corresponding to the flag F2 is executed (see step S745). Executions of control operations required to implement the remaining control functions are disabled.

As set forth above, the ECU 1A according to the third embodiment is so configured as to securely disable control operations unnecessary to be operated, making it possible to effectively reduce processing load and power consumption of the running microcomputer 3. The number and kinds of the control functions are not limited to those illustrated in FIG. 13, but can be determined accordingly.

The flash ROM to which the specific data is saved can be disposed at the exterior of the microcomputer 3. In place of the flash ROM, one of other types of memories, such as an EEPROM (Electrically Erasable Programmable Read Only Memory), can be used.

In each of the embodiments and their modifications, the elements provided in the microcomputer can be implemented as dedicated hardware devices, such as custom LSI (Large-Scale Integration) circuits.

In each of the embodiments and their modifications, the activate circuit 9 can be designed to a microcomputer having functional modules corresponding to the elements 43, 47, 49, 51, 53, and 55.

In each of the embodiments and their modifications, the present invention is applied to an ECU for controlling an engine and/or a transmission of a vehicle, but the present invention is not limited to the application. This application is preferable because operations of such an ECU designed to control drive of a vehicle must be highly ensured.

Specifically, the present invention can be applied to an ECU for controlling security functions of the vehicle. This application is preferable because, if the security functions are improperly operated, it is difficult to crank the engine, operations of such an ECU must be highly ensured.

Specifically, the present invention can be applied to an ECU for controlling engine starting of the vehicle. This application is preferable because, if the engine starting control is improperly operated, it is difficult to crank the engine, operations of such an ECU must be highly ensured.

Furthermore, the present invention can be applied to a control circuit for several of targets.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A computer circuit comprising:
a computer configured to operate based on a power supply voltage and to output a suspend signal when it is determined that a predetermined suspend condition is satisfied;
an activate circuit communicably coupled to the computer and configured to output a first activate request signal when it is determined that a predetermined activation condition is satisfied; and
a power supply circuit communicably coupled to the computer and the activate circuit so that the first activate request signal and a second activate request signal are input thereto, the second activate request signal being sent from an exterior of the computer circuit, the suspend signal output from the computer being directly input to the power supply circuit, the power supply circuit being configured to:
supply the power supply voltage to the computer;
interrupt supply of the power supply voltage to the computer when receiving the suspend signal; and
restart the supply of the power supply voltage to the computer when at least one of the first and second activate request signals is turned to a corresponding active state during interruption of the supply of the power supply voltage.

2. A computer circuit according to claim 1, wherein the second activate request signal consists of a plurality of external activate request signals, the external activate request signals being input to the power supply circuit.

3. A computer circuit according to claim 1, wherein the computer circuit is installed in a vehicle, and the second activate request signal includes at least one of:
an ignition switch signal representing turning on of an ignition switch installed in the vehicle;
an accessory switch representing turning on of an accessory switch installed in the vehicle;
a starter switch signal representing turning on of a starter switch installed in the vehicle;
a key switch signal representing insertion of a key into a key cylinder installed in the vehicle;
a fuel filler lid opener signal representing turning on of a fuel filler lid opener switch installed in the vehicle and configured to open a fuel filler opening of a fuel tank installed in the vehicle; and
a shift lock release signal representing turning on of a shift lock release switch installed in the vehicle.

4. A computer circuit according to claim 1, wherein the activate circuit comprises a timer for detecting that a predetermined period has elapsed since the output of the suspend signal from the computer, the activate circuit being configured to determine that the predetermined activation condition is satisfied when the timer detects that the predetermined period has elapsed, and to output the first activate request signal in response to the determination.

5. A computer circuit according to claim 4, wherein the activate circuit is connected to a communication line and configured to receive a specific signal externally sent through the communication line, and to output the first activate request signal when it is determined that the predetermined activation condition is satisfied by the receipt of the specific signal.

6. A computer circuit according to claim 1, further comprising first and second circuits communicably coupled to the computer and corresponding to the first and second activate request signals, the first and second circuits executing predetermined operations in response to the first and second activate request signals, respectively, wherein, when any one of the first and second activate request signals is turned to the corresponding active state, the computer disables the operation of one of the first and second circuits corresponding to the remaining one of the first and second activate request signals.

7. A computer circuit according to claim 6, wherein the computer is configured to interrupt a power supply voltage to be fed to the one of the first and second circuits, thereby disabling the operation of the one of the first and second circuits.

8. A computer circuit according to claim 6, wherein the computer is configured to output a signal indicative of operating disable to the one of the first and second circuits, thereby disabling the operation of the one of the first and second circuits.

9. A computer circuit according to claim 1, wherein the computer is configured to:
allow execution of first and second operations corresponding to the first and second activate request signals;
identify which of the first and second activate request signals is turned to the corresponding active state during the interruption of the supply of the power supply voltage; and
when it is identified that one of the first and second activate request signals is turned to the corresponding active state, disable the execution of one of the first and second operations corresponding to the other of the first and second activate request signals.

10. A computer circuit according to claim 1, wherein the power supply circuit comprises a monitoring unit, the monitoring unit being configured to:
monitor an operating state of the computer;
determine whether the computer properly operates based on the monitored operating state of the computer; and
reset the computer to return the computer to a normal state thereof when it is determined that the computer improperly operates based on the monitored operating state.

11. A computer circuit according to claim 10, wherein the power supply circuit is configured to ignore the suspend signal directly input thereto while the monitoring unit resets the computer.

12. A computer circuit according to claim 11, wherein the power supply circuit is configured to ignore the suspend signal directly input thereto within a predetermined period from release of the computer reset by the monitoring unit.

13. A computer circuit according to claim 10, wherein the monitoring unit is configured to perform the computer reset at an at least predetermined number of times within a constant period, and the power supply circuit is configured to interrupt the supply of the power supply voltage to the computer when all of the first and second activate request signals input to the power supply circuit are in corresponding inactive states after the at least predetermined number of times of the computer reset has been completed within the constant period.

14. A computer circuit according to claim 1, wherein the power supply circuit is configured to ignore the suspend signal output from the computer when it is determined that at least one of the first and second activate request signals is in the corresponding active state.

15. A computer circuit according to claim 1, wherein, when being activated based on the power supply voltage supplied from the power supply circuit, the computer is configured to monitor the first and second activate request signals input to the power supply circuit and, when it is determined that all of the activate request signals are in corresponding inactive states, to output the suspend signal.

16. A computer circuit according to claim 1, wherein, when being activated based on the power supply voltage supplied from the power supply circuit, the computer is configured to:
monitor the first and second activate request signals input to the power supply circuit;
repeatedly determine whether all of the activate request signals are in inactive states; and
output the suspend signal when all of the repeat determinations represent that all of the activate request signals are in corresponding inactive states.

17. A computer circuit according to claim 1, wherein the power supply circuit comprises a record storing unit configured to, when at least one of the first and second activate request signals input to the power supply circuit is turned to the corresponding active state, store record information representing that at least one of the first and second activate request signals input to the power supply circuit is turned to the corresponding active state, and, when being activated, the computer is configured to:
access the record storing unit;
determine whether the record information has been stored in the record storing unit based on the accessed result; and
output the suspend signal to the power supply circuit when it is determined that no record information has been stored in the record storing unit.

18. A computer circuit according to claim 1, further comprising a nonvolatile memory provided in at least one of an interior and exterior of the computer, wherein the computer includes a volatile memory, and, when it is determined that the predetermined suspend condition is satisfied and that specific data has been stored in the volatile memory, the computer is configured to save the specific data in the nonvolatile memory, and to output the suspend signal after completion of the specific data saving, the specific data being required to be continuously stored during interruption of the power supply voltage to the computer.

19. A computer circuit according to claim 1, wherein, when receiving the suspend signal output from the computer, the power supply circuit is configured to:
determine whether at least one of the first and second activate request signals are turned to the corresponding active state within a predetermined wait period from the receipt of the suspend signal;
interrupt the supply of the power supply voltage to the computer when it is determined that no activate request signals are turned to the corresponding active states; and
reset the computer to restart the computer from a normal state thereof without interrupting the supply of the power supply voltage when it is determined that at least one of the first and second activate request signals is turned to the corresponding active state.

20. A computer circuit according to claim 1, wherein, when receiving the suspend signal output from the computer, the power supply circuit is configured to:
determine whether at least one of the first and second activate request signals are turned to the corresponding active state within a predetermined wait period from the receipt of the suspend signal;
interrupt the supply of the power supply voltage to the computer when it is determined that no activate request signals are turned to the corresponding active states; and
maintain the supply of the power supply voltage to the computer when it is determined that at least one of the first and second activate request signals is turned to the corresponding active state, and
wherein the computer has stored therein a program and is configured to:
repeatedly determine whether at least one of the first and second activate request signals input to the power supply circuit is turned to the corresponding active state after the output of the suspend signal; and
cause an execution location thereof to jump to a start address of the program from which the computer should execute at initial start up when it is determined that at least one of the first and second activate request signals input to the power supply circuit is turned to the corresponding active state.

21. A computer circuit according to claim 1, wherein, when receiving the suspend signal output from the computer, the power supply circuit is configured to:
  determine whether at least one of the first and second activate request signals are turned to the corresponding active state within a predetermined wait period from the receipt of the suspend signal;
  interrupt the supply of the power supply voltage to the computer when it is determined that no
  activate request signals are turned to the corresponding active states; and
  maintain the supply of the power supply voltage to the computer when it is determined that at least one of the first and second activate request signals is turned to the corresponding active state, and
  wherein the computer has stored therein a program and is configured to:
  determine whether a predetermined period has elapsed since the output of the suspend signal, the predetermined period being longer than the wait period; and
  cause an execution location thereof to jump to a start address of the program from which the computer should execute at initial start up when it is determined that the predetermined period has elapsed since the output of the suspend signal.

22. A computer circuit according to claim 1, wherein the activate circuit is configured to shift into a power consumption reducing mode in response to the output of the suspend signal from the computer, the power consumption reducing mode allowing power consumption in the activate circuit to be reduced.

23. A computer circuit according to claim 1, wherein the suspend signal has a low level and a high level higher than the low level, and the low level of the suspend signal is set to the corresponding active state thereof.

24. A computer circuit according to claim 1, wherein, when the power supply circuit is configured to interrupt the supply of the power supply voltage to the computer, the activate circuit and the power supply circuit are configured not to output, to the computer, signals each having a high level.

25. A computer circuit according to claim 1, wherein the computer circuit is installed in a vehicle and configured to control at least one of an engine and transmission installed in the vehicle.

26. A computer circuit according to claim 1, wherein the computer circuit is installed in a vehicle and configured to control at least one of devices installed in the vehicle.

27. A computer circuit according to claim 1, wherein the computer circuit is installed in a vehicle and configured to control security function installed in the vehicle.

28. A computer circuit according to claim 1, wherein the computer circuit is installed in a vehicle and configured to control starting of an engine installed in the vehicle.

* * * * *